Dec. 28, 1937.  M. L. NELSON ET AL  2,103,297
STOCK QUOTATION SYSTEM
Original Filed April 19, 1930    17 Sheets-Sheet 5
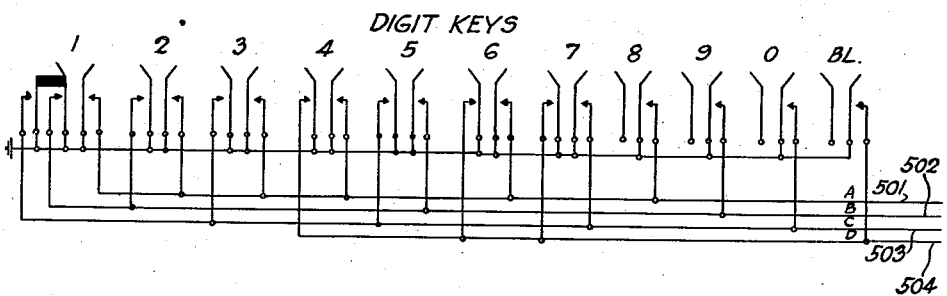
Fig. 5
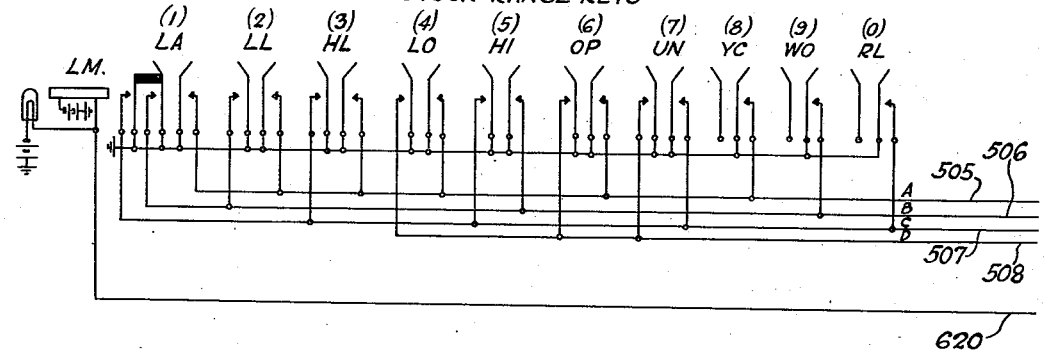
Fig. 21
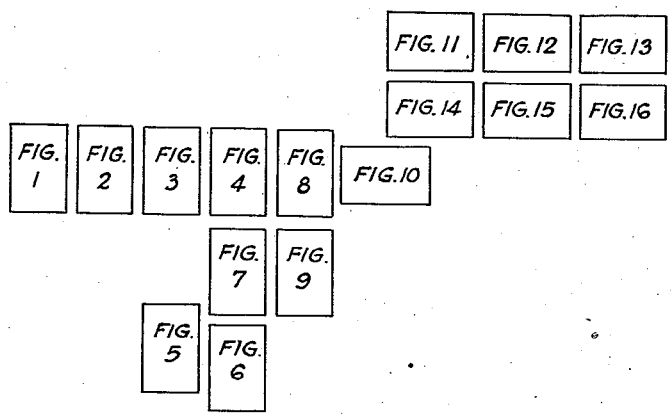
Inventors
Martin L. Nelson
Harold C. Robinson
John I. Bellamy
Wm Walter Owen
Atty.

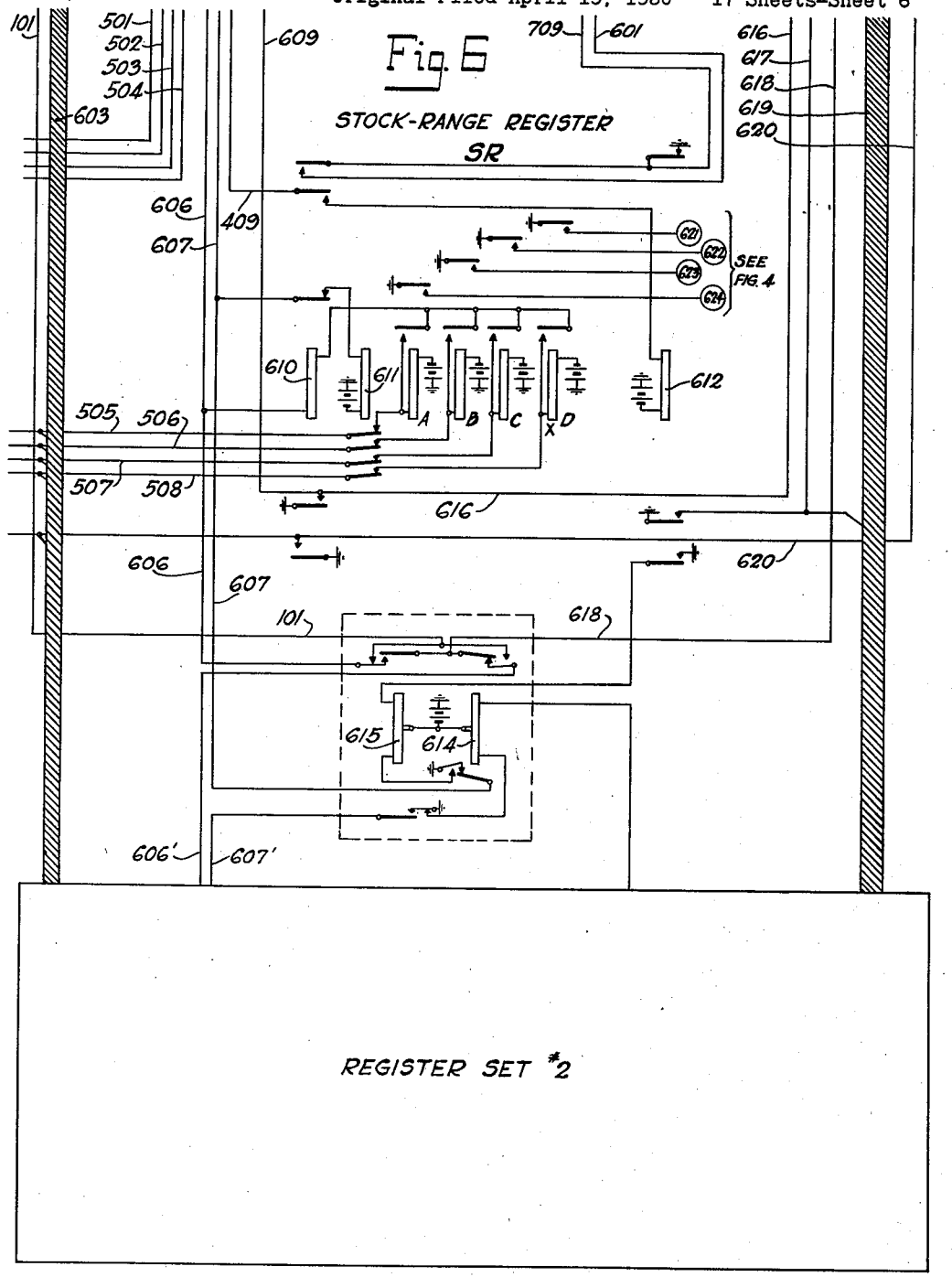

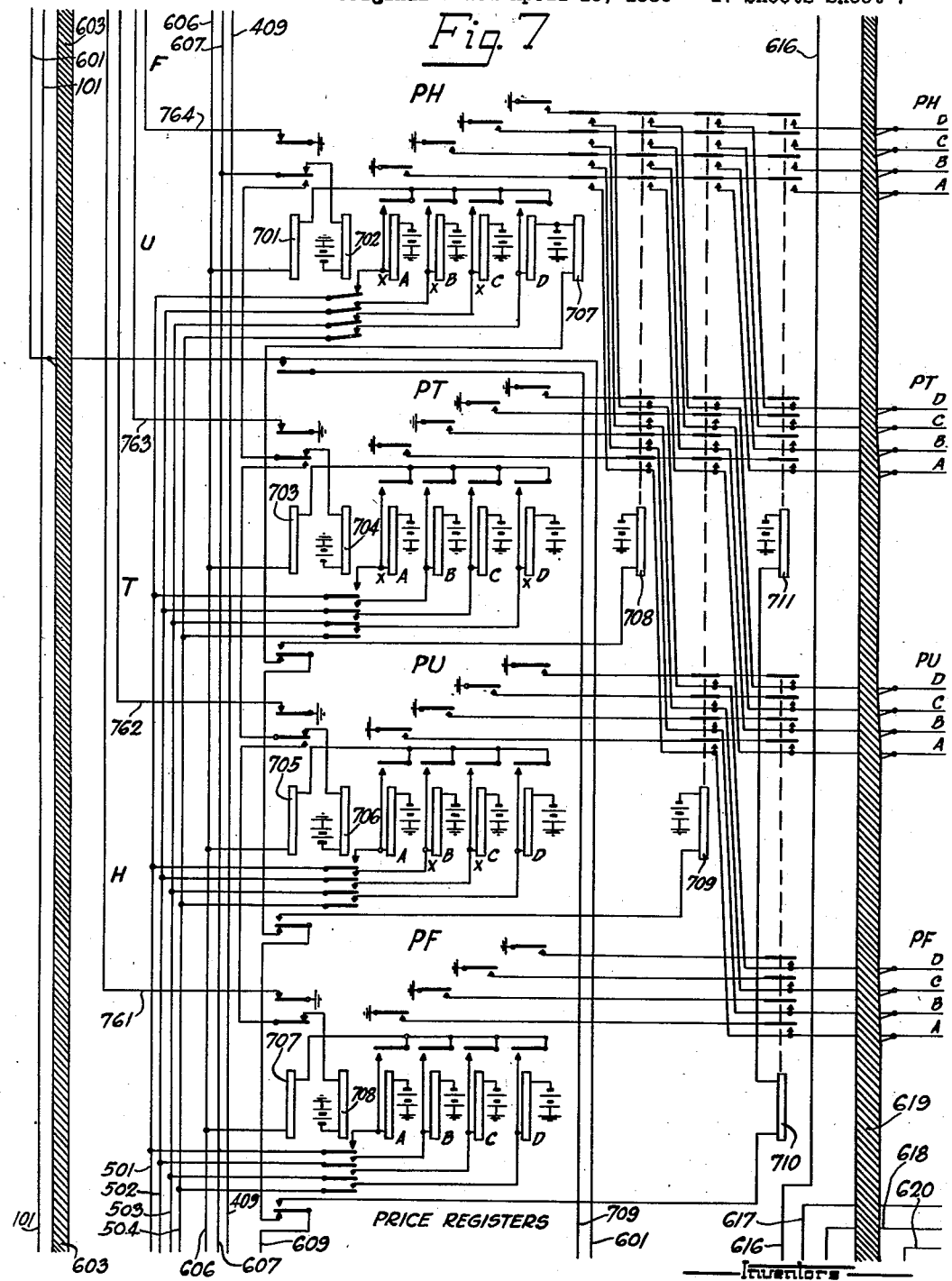

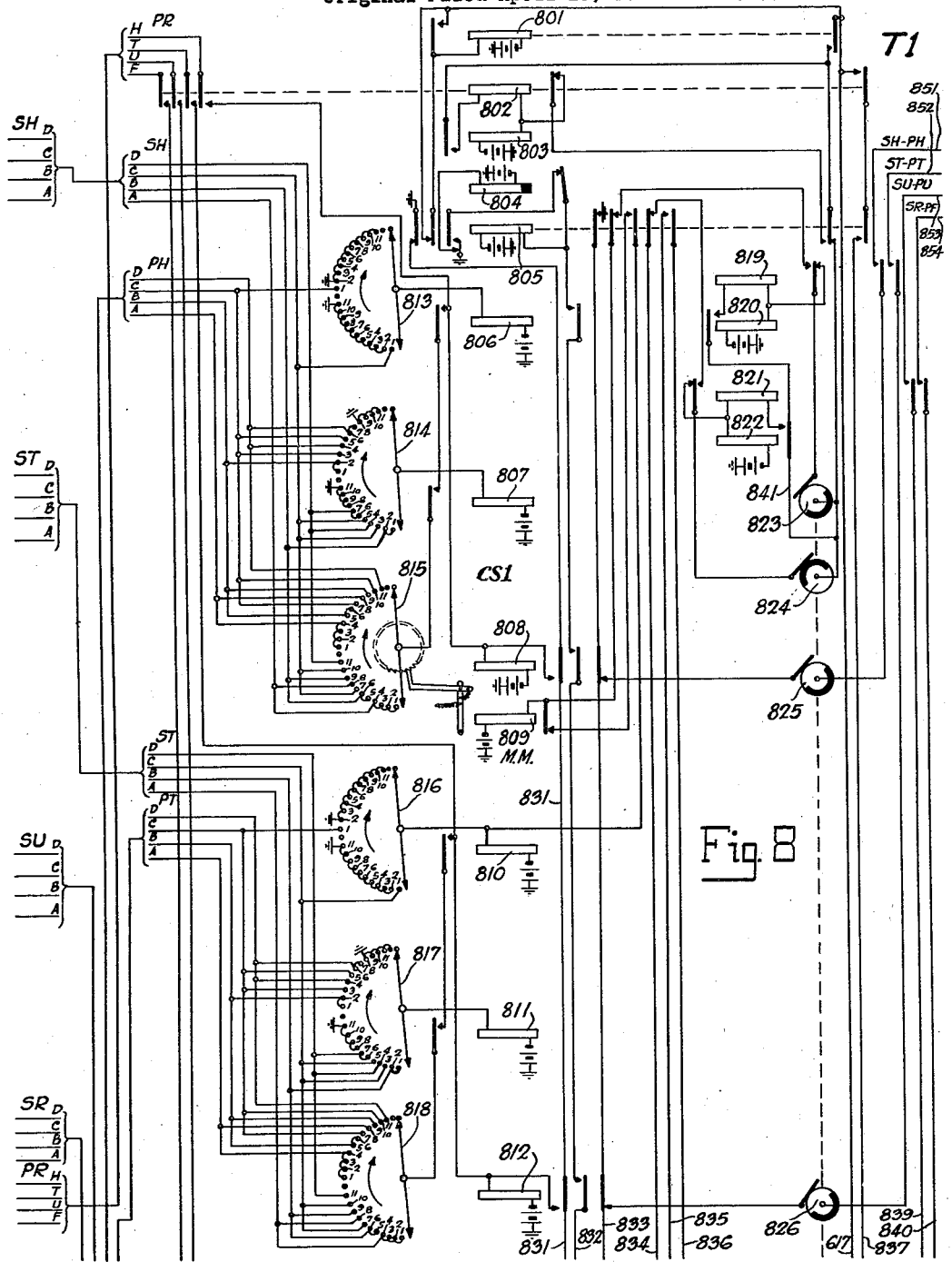

Dec. 28, 1937. M. L. NELSON ET AL 2,103,297
STOCK QUOTATION SYSTEM
Original Filed April 19, 1930   17 Sheets-Sheet 10
Fig. 10
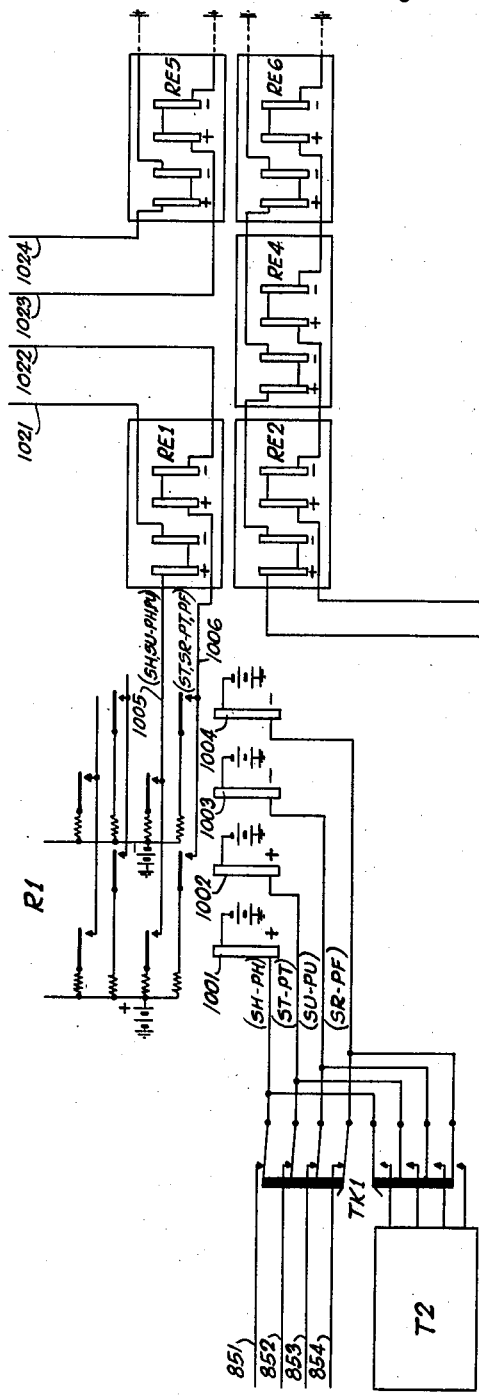
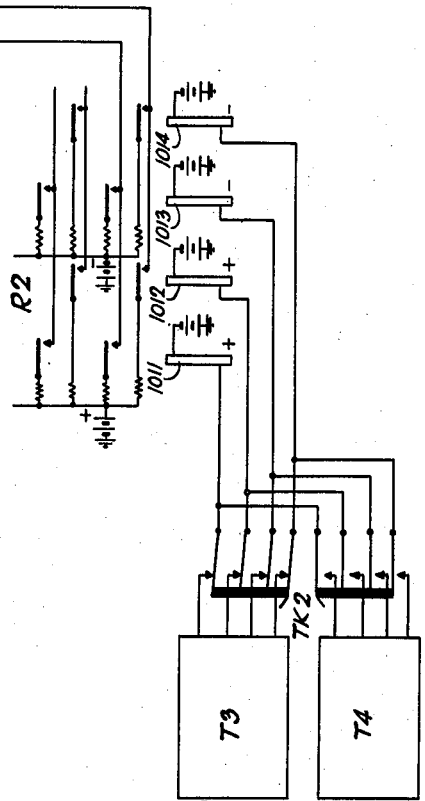
Inventors
Martin L. Nelson
Harold C. Robinson
John I. Bellamy
Atty.

Dec. 28, 1937.　　M. L. NELSON ET AL　　2,103,297
STOCK QUOTATION SYSTEM
Original Filed April 19, 1930　　17 Sheets-Sheet 12

Inventors
Martin L. Nelson
Harold C. Robinson
John I. Bellamy
Wm. Walter Owen
Atty.

Dec. 28, 1937.   M. L. NELSON ET AL   2,103,297
STOCK QUOTATION SYSTEM
Original Filed April 19, 1930   17 Sheets-Sheet 15

Fig.15
LOCAL SENDER

Inventors-
Martin L. Nelson
Harold C. Robinson
John L. Bellamy

Atty.

Dec. 28, 1937.　　　M. L. NELSON ET AL　　　2,103,297
STOCK QUOTATION SYSTEM
Original Filed April 19, 1930　　17 Sheets-Sheet 16

Fig. 16

Inventors
Martin L. Nelson
Harold C. Robinson
John I. Bellamy
Wm. Walter Owen
Atty Dec. 28, 1937.    M. L. NELSON ET AL    2,103,297
STOCK QUOTATION SYSTEM
Original Filed April 19, 1930    17 Sheets-Sheet 17
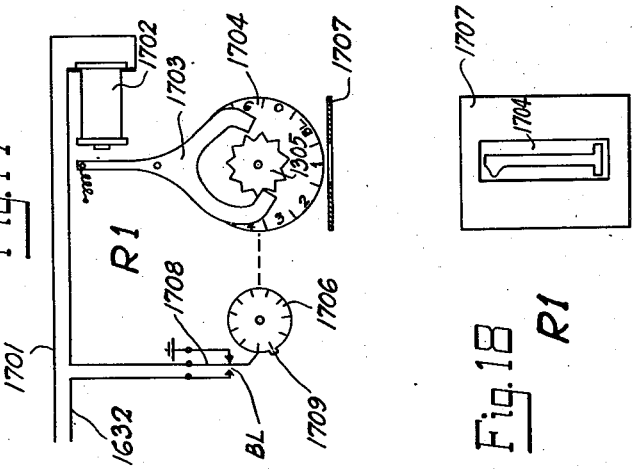
Inventors
Martin L. Nelson
Harold C. Robinson
John I. Bellamy Patented Dec. 28, 1937

2,103,297

UNITED STATES PATENT OFFICE 2,103,297

STOCK-QUOTATION SYSTEM

Martin L. Nelson, Park Ridge, Ill., Harold C. Robinson, Baltimore, Md., and John I. Bellamy, Brookfield, Ill., assignors, by mesne assignments, to Associated Electric Laboratories, Inc., Chicago, Ill., a corporation of Delaware Original application April 19, 1930, Serial No. 445,746. Divided and this application March 26, 1931, Serial No. 525,476. Renewed May 17, 1937

20 Claims. (Cl. 177—353)

The present invention relates to stock-quotation systems in general, but is concerned more particularly with systems of this kind wherein a central-station transmitter or register sender transmits stock-quotation signals to a number of stock-quotation receivers or display boards.

This application is a division of our application Serial No. 445,746, filed April 19, 1930. In the parent application, the main object, broadly stated, is the production of a new and improved transmitting and receiving system suitable for transmitting information regarding the selling price of stocks so that such prices may be received and set up on indicators at a plurality of points.

This divisional application covers the novel features of the new and improved receiver or display indicator, one of which is provided at each place whereat the transmitted quotations are to be received and displayed.

The system herein disclosed is similar in certain respects to the system disclosed in the application of Bellamy et al. Serial No. 378,208, filed July 15, 1929, and to the system disclosed in the application of Bellamy, Serial No. 413,205, filed December 11, 1929. As pointed out in these prior applications, it is customary for a stock broker to have a so-called stock ticker in his office from which a tape slowly unwinds, giving the selling prices of the active stocks. The broker has an attendant who reads the tape and marks down on a blackboard the prices of such stocks as the broker deals in, so that the waiting customers may see the trend of the market. In addition to showing the last selling price in a space provided under the name of a given stock, the blackboard shows yesterday's closing price, today's opening price, the high price of the day, and the low price of the day.

General description

One outstanding disadvantage of the method of procedure above outlined is that the person writing down the prices and making continuous changes is as often as not in such a position as to obscure the board from the view of the customers. In addition, the total amount of labor required, considering the brokers' offices as a whole, is quite enormous, and it is to the interest of efficiency to reduce this labor to a minimum. For this purpose, it is proposed in the above-mentioned prior applications, to provide a single point at which the desired information can be recorded and to provide an automatically-operated indicator in each broker's office controlled from a separate transmitter at the single recording point.

It is proposed further in the said prior applications, to make use of the usual ticker tape at the central point, and to provide two operators for setting up the quotations. The stocks are listed by means of the letters of the alphabet, some stocks being represented by a single letter, some by two, and others by three. In order to make a division of stocks between the two operators, all stocks represented by the letters A to K may be assigned to one operator, as well as all stocks of two or three letters of which the first letter is A to K. The second operator takes care of the sales involving the stocks L to Z and the plural-letter stocks whose designations begin with any one of the letters L to Z.

Certain outstanding features that distinguish the present system from the systems disclosed in the above-mentioned prior applications are as follows:

1. In the transmitter, instead of providing translating relays permanently connected to the stock-letter registers with a plurality of separate circuits carried by the contacts of each translating relay, stock translating relays arranged to be individual to the respective stocks are provided in a number estimated to be sufficient to meet the requirements, and arrangements are provided for shifting the connections of the individual stock relays from time to time as stocks appearing in the market are removed and other stocks are added.

2. In order to increase the speed at which the digits representing stock quotations can be transmitted, two conductors are provided between the transmitter and the receiver, and impulses of two polarities are sent over the two conductors, enabling four digits to be transmitted in the same time as one.

In addition to the foregoing, the present disclosure contains a number of novel features, having to do for the most part with the detailed workings of the system, which can be understood best in connection with a description of the operation.

Description of drawings

Referring now to the drawings comprising Figs. 1-21, they show by means of the usual circuit diagrams and mechanical drawings a transmitting and receiving system embodying the features of the invention. More in particular, Figs. 1-9 show a transmitter which may be designated as the transmitter T1; Fig. 10 indicates the transmitters T2, T3, and T4, together with a few of the plurality of receivers; Figs. 10-16 show circuit drawings of one of the receivers, RE3; Figs. 17 and 18 indicate mechanical details of a stock register used in the receiver; Fig. 19 is a table showing the code according to which the transmitter is operated; Fig. 20 shows the code according to which the local sender in the receiver is operated; and Fig. 21, appearing on the lower part of the same sheet with Fig. 5, is a layout of Figs. 1 to 16.

The transmitter

Figure 1:
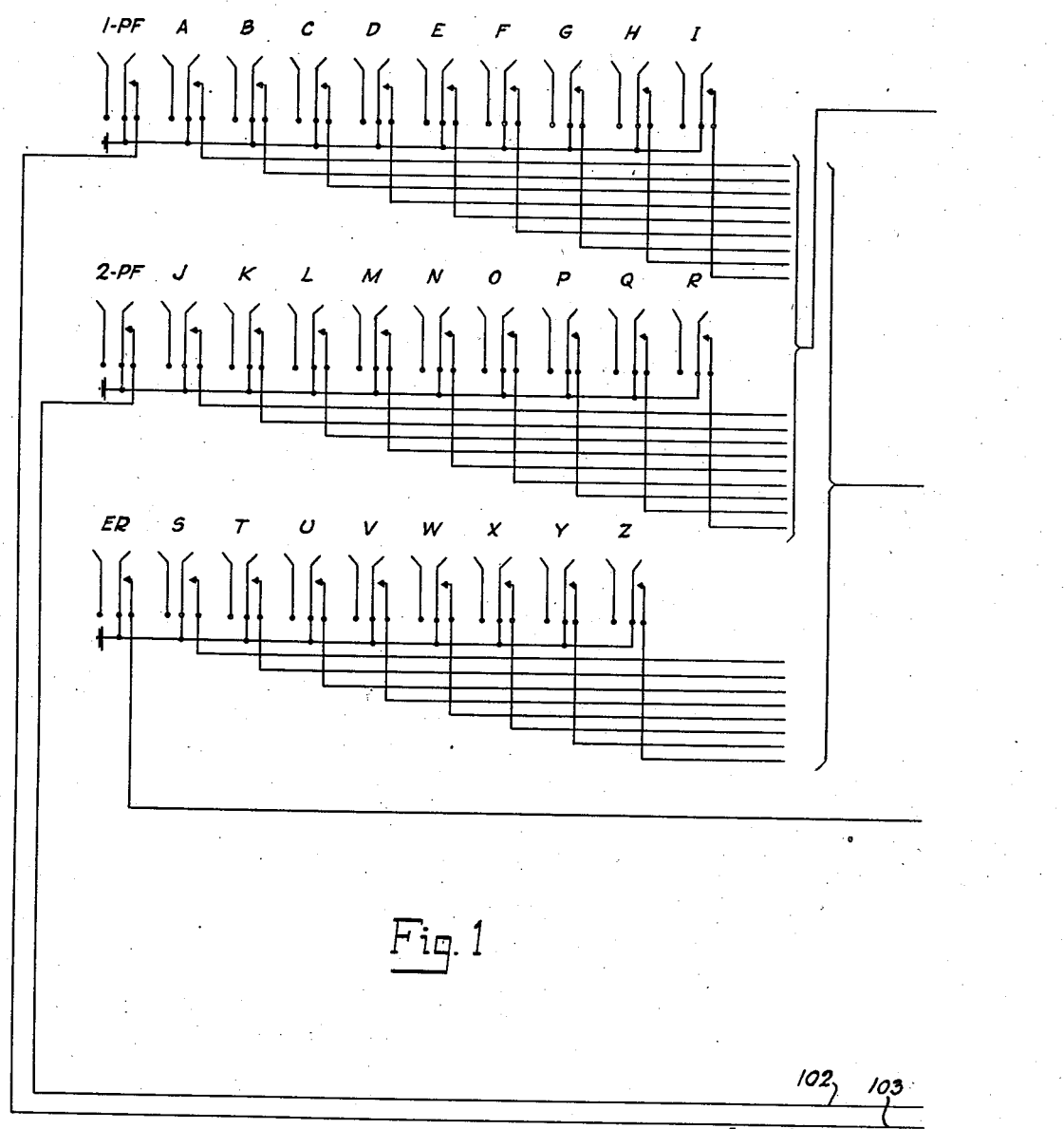
Figure 2:
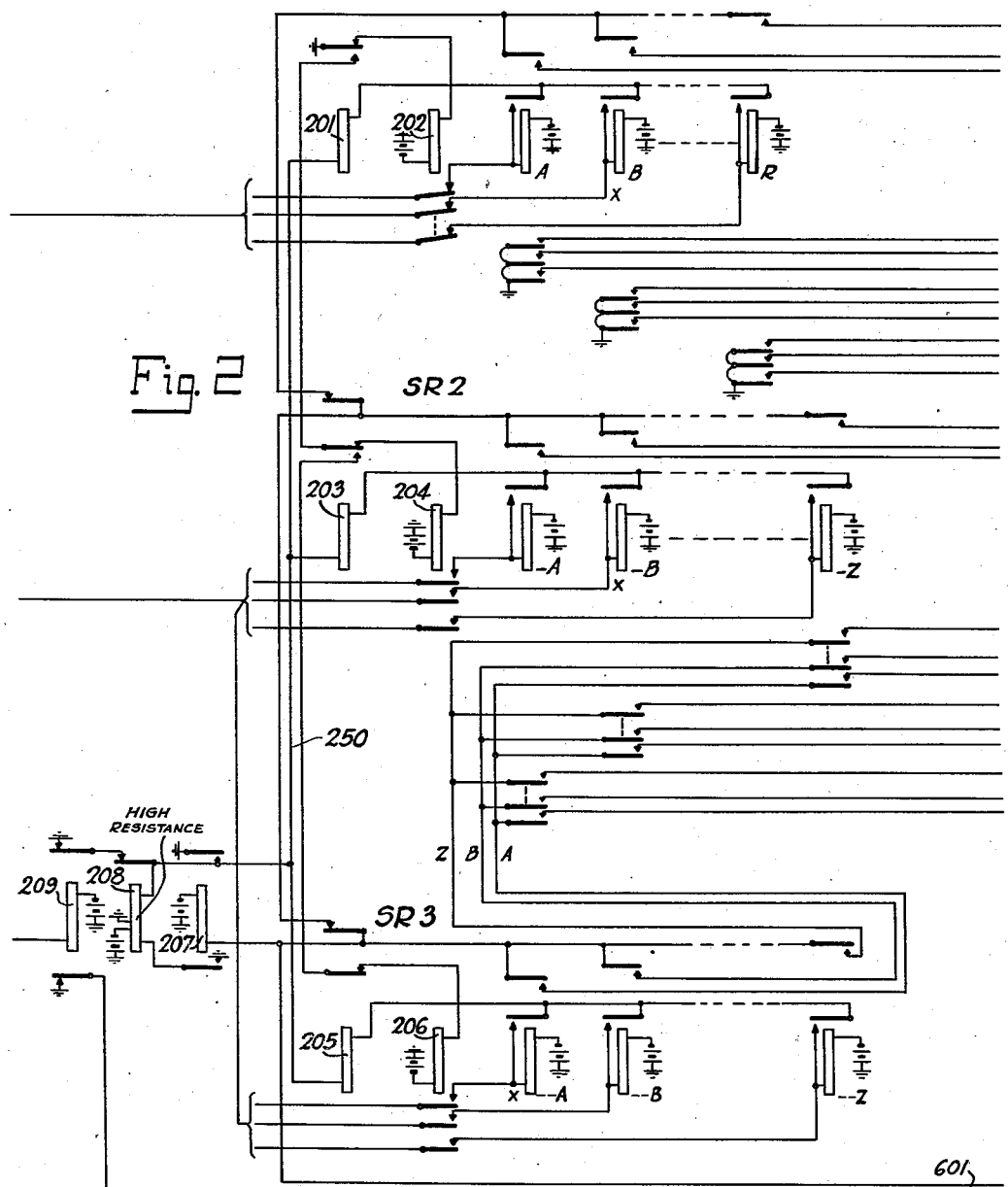
Figure 3:
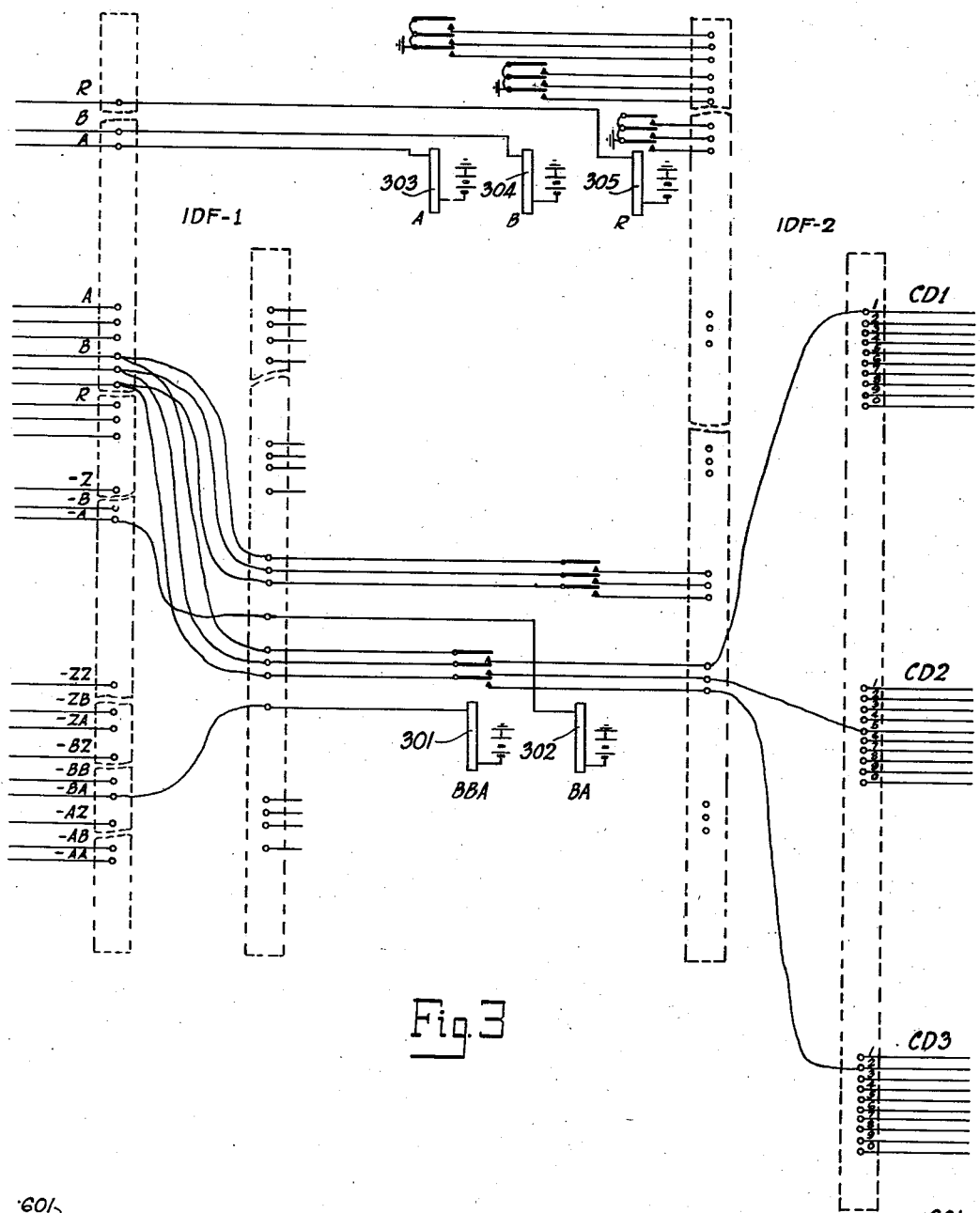

In the transmitter, Figs. 1 to 9, the apparatus for registering the stock-designating letters, set up on the stock letter keys of Fig. 1, comprises the stock registers SR1, SR2, and SR3 of Fig. 2; and the apparatus for translating the registration of stock letters into a three-digit code to be sent to the receiving stations comprises the individual stock relays of Fig. 3, as well as the intermediate distributing frames IDF—1 and IDF—2. The price registers for registering the price (at which a current stock transaction took place) under the control of the digit keys of Fig. 5 comprises the price registers shown in Fig. 7. The price register PH registers the price-hundreds digit; the register PT registers the price-tens digit; the register PU registers the price units; and the register PF registers the price-fractions digit. These designations hold true in case a full price quotation is sent, but the arrangement varies somewhat in case a lesser number of price digits is sent as will be hereinafter explained.

Figure 4:
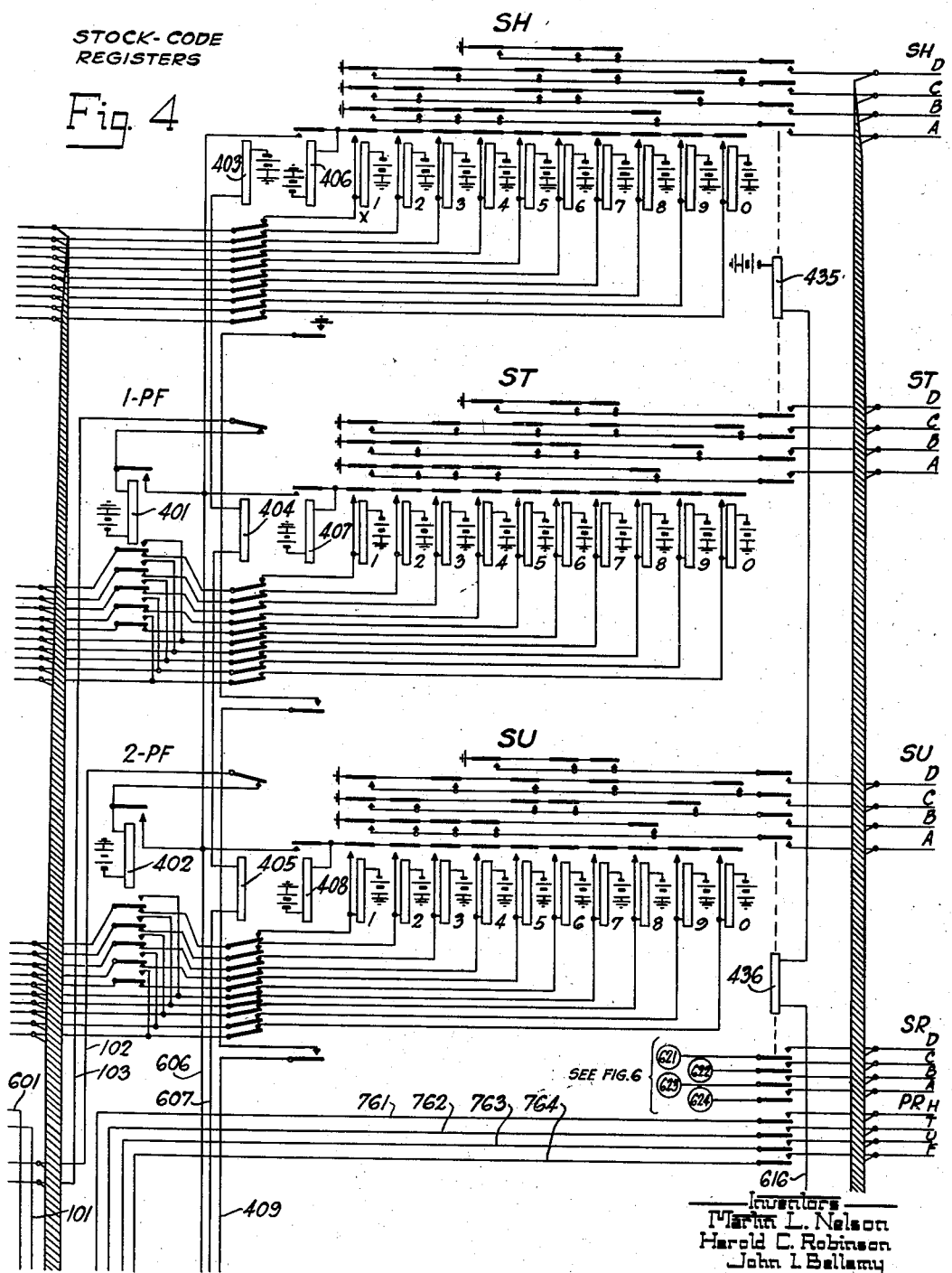

The stock-code registers, shown in Fig. 4, are set from the translating apparatus of Figs. 2 and 3 through the intermediate distributing frames IDF—1 and IDF—2, and they comprise the stock-hundreds register SH, the stock-tens register ST, and the stock-units register SU. It may be further pointed out that a so-called stock-range indication (to be later explained) is registered on the stock-range register SR of Fig. 6 under control of the range keys of Fig. 5, and that a price-range registration is set up automatically by the action of the transfer relays, 701, 703, 705, and 707, associated with the price registers of Fig. 7.

It will be noted that the lower portion of Fig. 6 includes a rectangle labelled "register set #2." This register set #2 contains a duplicate of the equipment shown in Figs. 4 and 7, of the equipment of Fig. 6, shown above, and the relays 614 and 615. The two register sets are arranged to be used alternately so that a second registration may be set up immediately following the first and while the first is held stored on the first register set and is being transmitted. The relays 614 and 615 are common to the two registers and are arranged to switch from one register to another automatically at the end of a registration so as to automatically switch the next register into service.

Figure 9:
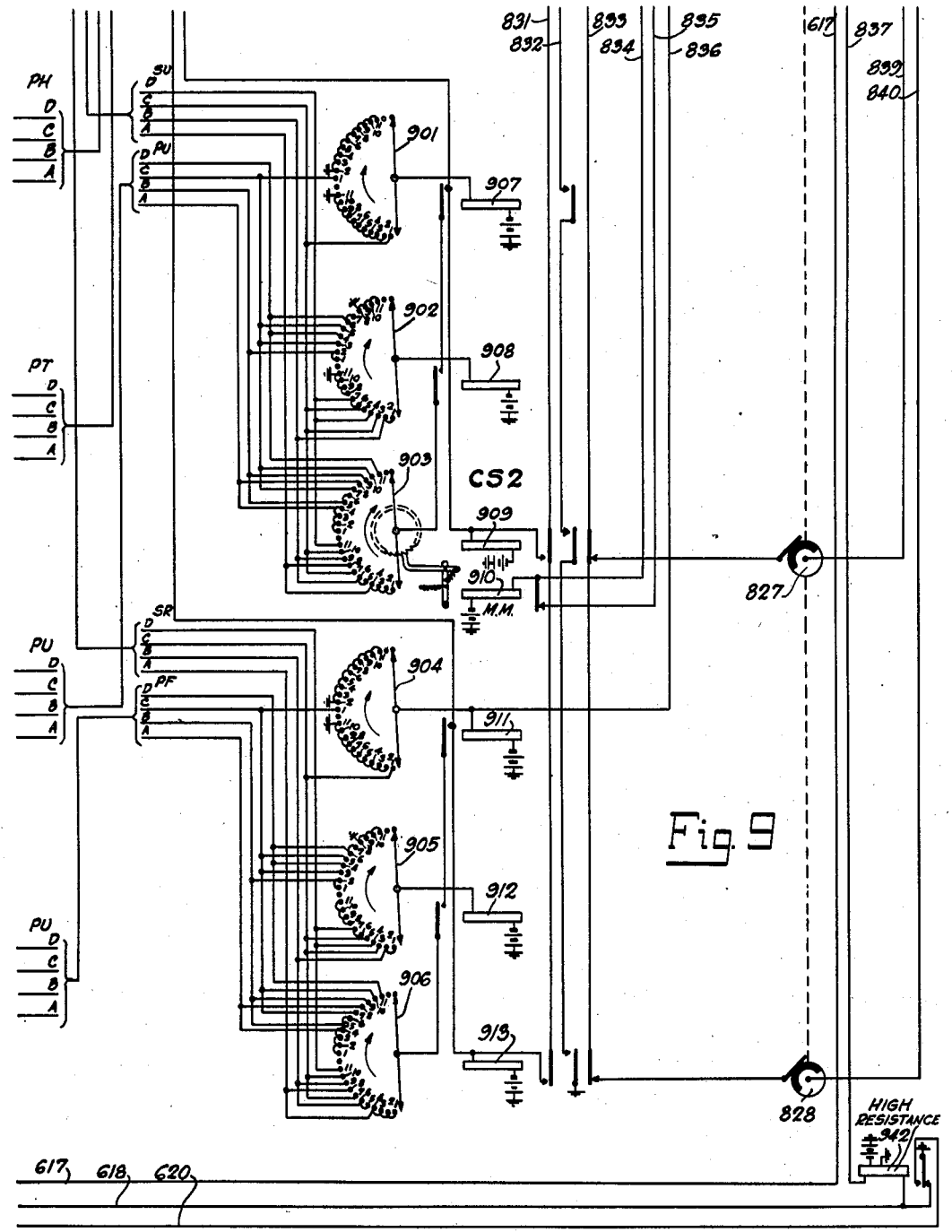

The apparatus shown in Figs. 8 and 9 is the sending apparatus and it sends digit impulses under the control of the two register sets shown in Figs. 4, 6, and 7. The impulses transmitted by the sender of Figs. 8 and 9 go out over the conductors 851—854 and are repeated to the several receiving stations by the repeater R1, Fig. 10, as will be hereinafter explained.

The receiver

Figure 11:
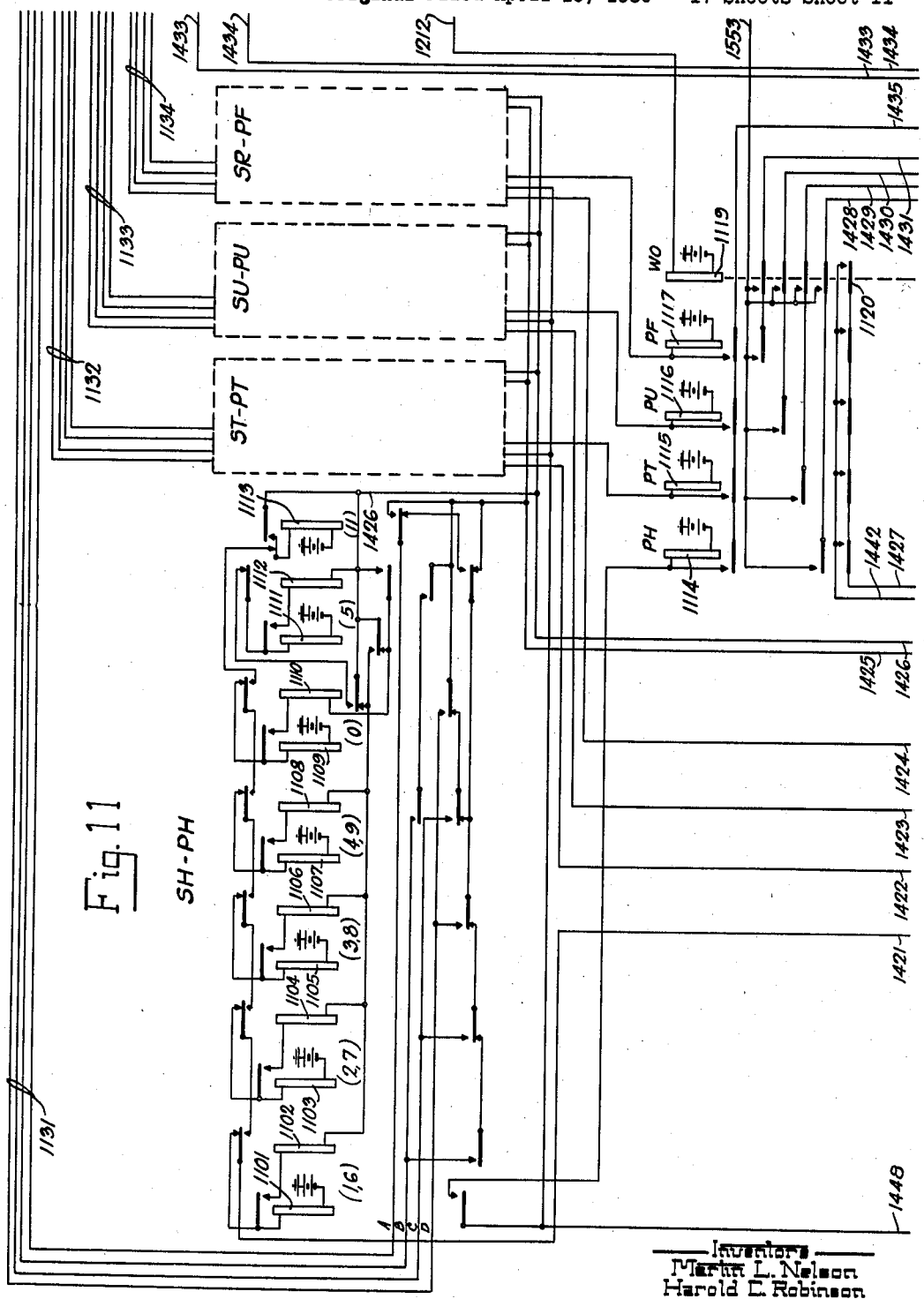
Figure 12:
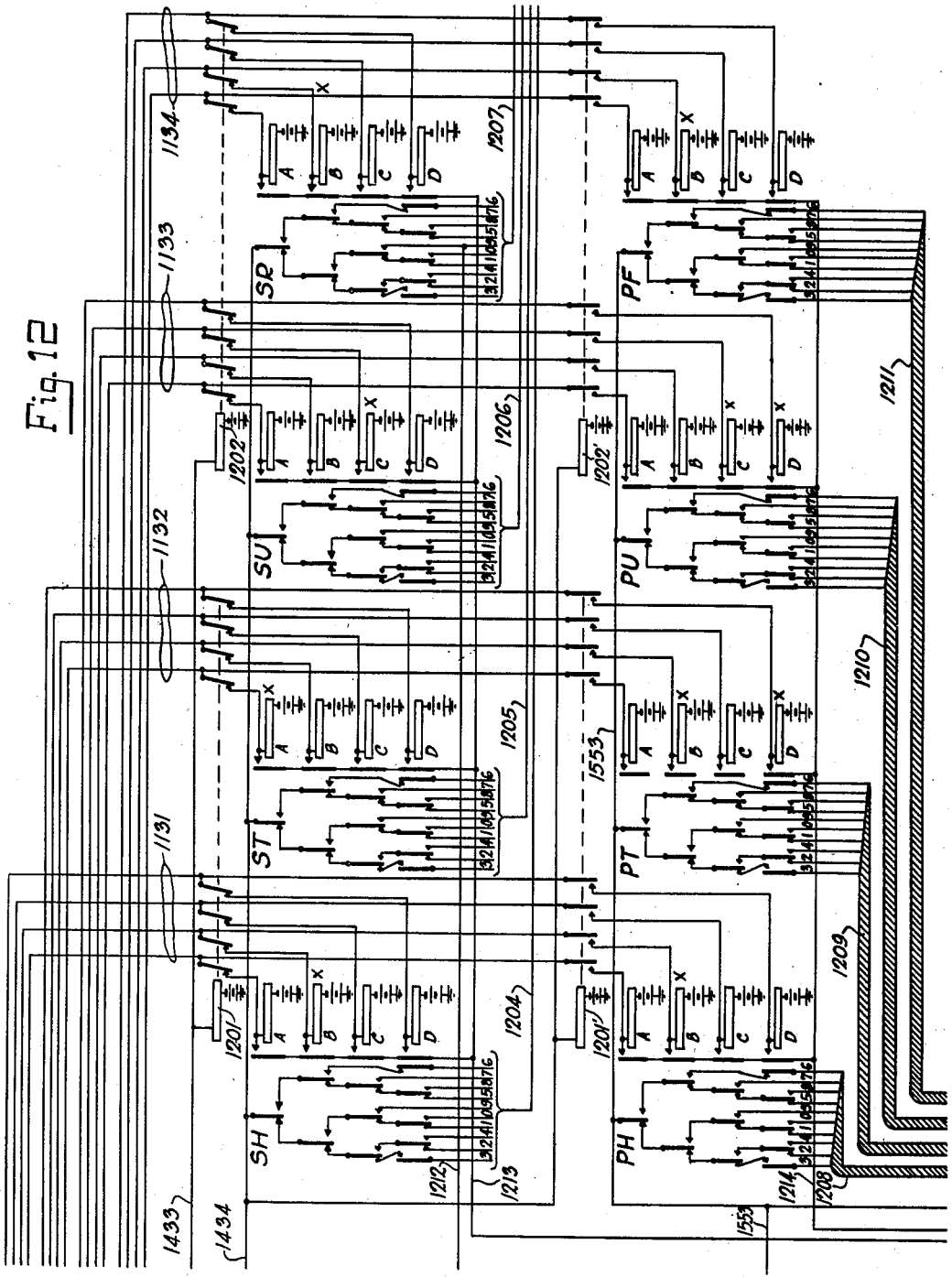

In the receiver, Figs. 11-16, the polarized impulse relays 1401—1404 respond to impulses sent out by the transmitter of Figs. 1-9 and repeated by the repeater R1, Fig. 10, and send impulses to set the primary or receiving registers of Fig. 11, SH—PH, ST—PT, SU—PU, and SR—PF. These primary registers, in turn, transfer the received digits to the stock and price secondary registers or storage devices of Fig. 12. The stock registers of Fig. 12 are labeled SH, ST, SU, and SR. They are the hundreds, tens, units, and range registers, respectively. The price registers are labeled PH, PT, PU, and PF. They are the hundreds, tens, units, and fractions registers, respectively.

Figure 13:
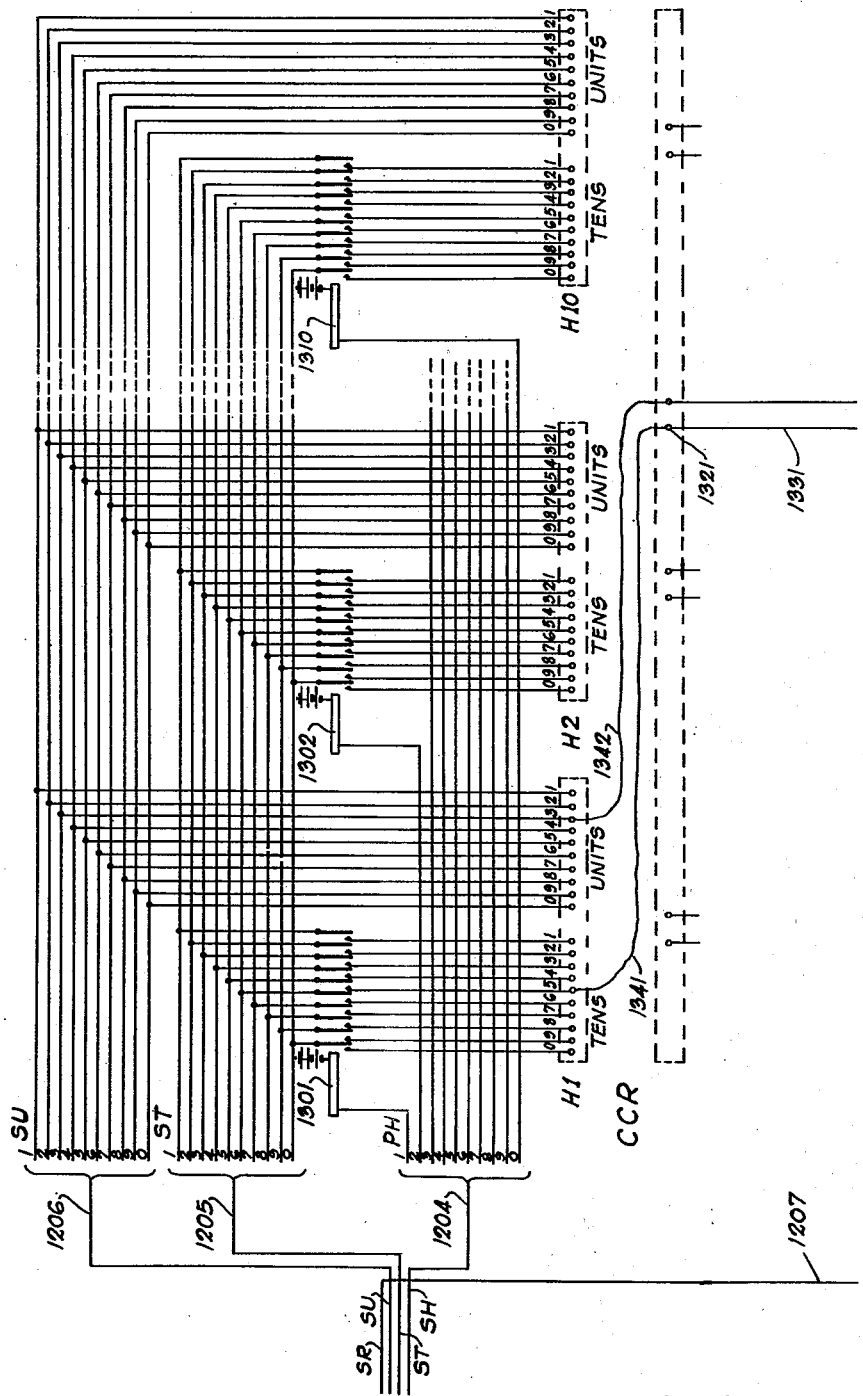

Fig. 13 shows the stock-relay hundreds selector comprising relays 1301—1310, of which the relays 1301, 1302, and 1310 only are shown; together with the associated terminals provided below the relays for suitable interconnection between the relay contacts and the stock relays, such as the stock relay 1641. The stock relays are divided into ten groups of not more than one hundred relays a group, and the relays of Fig. 13 are operated in accordance with the stock-hundreds digit to select the hundreds group in which a stock relay is to be operated.

Each stock on the receiving board is represented by twenty registers, such as the register R1, Figs. 17 and 18, Fig. 18 being a front view. These registers are arranged in five horizontal rows, four to a row. The top row (YC) indicates yesterday's closing price; the next row (OP) indicates today's opening price; the next row (HI) indicates today's high price; the next row (LO) indicates today's low price; and the bottom row (LA) shows the last price at which the stock sold. The stock-range relays 1655 and 1659, operated under the control of the stock-range register SR, Fig. 10 (assisted by the combination relays 1651—1654) correspond, respectively, to the rows of stock registers above named. If the relay 1659 alone is operated, the incoming price digits are transmitted to the top row only of the registers, the other relays 1655—1658 controlling the other rows, respectively.

Fig. 15 shows the local sender which operates under the control of the price registers of Fig. 12 to send impulses to the stock registers, Fig. 16.

Detailed description

The system having been described generally, a detailed description of the operation of the apparatus shown will now be given. For this purpose, a description will be given of the operations involved when the operator at the transmitter T1, shown in Figs. 1 to 8, and 8A sets up a quotation on her key set, of which the stock-letter keys are shown in Fig. 1, and the digit keys and range keys are shown in Fig. 5.

It will be assumed that the register set #1, comprising the registering apparatus of Figs. 4 and 7, and of the upper portion of Fig. 6, is in service at this time, this being true because the relay 614 is energized, as shown, and because the relay 615 is deenergized, as shown. It will be assumed further that the letters representing the stock whose quotation is to be transmitted is the one represented by the letters B, B, and A, and that the price to be transmitted is 104 and ⅛ dollars (104⅛). The numerator only of the fractions of dollars is transmitted; the denominator 8, being the same in all cases, is not transmitted.

It will be assumed further that this is neither the high price nor the low price of the day and that it is accordingly set up as merely the last price, abbreviated, LA. The full indication to be set up may be represented by BBA—1041—LA. The first portion is set up by operating the stock-letter keys of Fig. 1. The second portion is set up by operating the digit keys of Fig. 5; and the final portion (the stock range indication) is set up by operating a range key of Fig. 5.

Stock registration

To set up this "number", BBA—1041—LA, the operator first operates the letter key B of Fig. 1. These keys, it will be understood, are non-locking keys of the push-button type, being arranged so that, when the operator, having depressed a key to close the contacts thereof, releases the key, the operating plunger returns to normal, and the contacts of the key open.

When the key B is pushed, a circuit is closed from ground through the contacts of the key and through contacts of the normally-energized connecting relay 202 for the register relay B of the stock register SR1. Relay B energizes and at its inner-upper armature closes a locking circuit for itself through the transfer relay 201 from the grounded conductor 250, which is grounded through contacts of relays 207, 208, and 209. The locking circuit for relay B does not become effective, and relay 201 remains short circuited and de-energized, as long as the key B of Fig. 1 is held depressed; but, when the key B is released, the short circuit is removed from around relay 201 and it energizes in series with relay B and opens the circuit of relay 202 and closes a circuit for connecting-relay 204 through the inner armature of relay 203. Relay 204 pulls up, and relay 202 falls back and disconnects the conductors of the keys A to R from the storage relays A to R of the stock register SR1. It will be noted, of course, that only the relays A, B, and R of this set are shown and that only the corresponding contacts of relay 202 are shown. It will be understood that the intervening relays are connected up in the same manner as those shown. A similar curtailment occurs in the case of the registers SR2 and SR3, and in each case, it has been for the purpose of simplifying the drawings.

When the operator depresses the stock-letter key B to register the second stock letter B, a circuit is closed through contacts of relay 204 of the stock register SR2 for the B relay in this stock register. It will be noted that this relay is designated —B. This indicates that the operation of this relay registers the second letter of a stock, and that the first letter may be any one of several. When the relay —B operates, it closes at its inner-upper armature a locking circuit for itself to the said grounded conductor 250 by way of the transfer relay 203. Relay 203 is accordingly operated when the key B of Fig. 1 is allowed to restore, and it transfers the operating ground from relay 204 to relay 206 by way of contacts of the transfer relay 205. Accordingly, relay 204 falls back and disconnects the stock-letter keys A to Z from the second-letter storage relays —A to —Z, and relay 206 energizes through contacts of relays 201, 203, and 205, and connects the stock-letter keys A to Z to the third-letter relays — —A to — —Z of the stock register SR3. The relays of the register SR3 are designated in this manner to indicate that they are the third letter relays and that the first two letters are variable letters; that is, either one of the first two letters may be any one of a plurality.

When the operator depresses the key A of Fig. 1 to register the third letter A, a circuit is closed through contacts of relay 206 for the relay — —A, which operates and at its inner-upper armature closes a locking circuit for itself through relay 205 to the grounded conductor 250. Accordingly, transfer relay 205 operates in series with relay — —A when the A key is released, and at its inner armature it disconnects relay 206 and allows it to fall back and disconnect the stock-letter keys from the associated relays — —A to — —Z.

The stock BBA, concerning which the quotation is about to be transmitted, has now been identified on the registering apparatus of Fig. 2 by the above-described energization of relay B of the stock register SR1, of relay —B of the stock register SR2, and of the relay — —A of the stock register SR3. This three-letter registration is to be subsequently translated by the translating apparatus of Fig. 3 into a pre-assigned three-digit code in a manner to be hereinafter pointed out.

Price registration

Referring now to Figs. 5, 6, and 7, when the operator depresses the digit key 1, Fig. 5, to register the price-hundreds digit 1 of the price designation 1041, a circuit is closed from ground through the three contact pairs of the digit key 1 over conductors 501, 502, and 503, for the storage relays A, B, and C (see code table, Fig. 19), of the price-hundreds register PH, Fig. 7, through contacts of connecting relay 702, which latter relay is energized through contacts of transfer relay 701 from the grounded conductor 607, conductor 607 being supplied with ground potential through the lower armature of the energized relay 614 of Fig. 6. When relays A, B, and C of PH operate, they close locking circuits for themselves at their inner armatures through transfer relay 701 to the grounded conductor 606, conductor 606 being grounded at this time through the normally-closed contacts controlled by the upper armature of relay 615, conductor 101, and the lower contacts of the "error" relay 209, Fig. 2. As a result, when the digit key 1 of Fig. 5 is allowed to restore, the locking circuit for relays A, B, and C becomes effective, and relay 701 energizes therein and transfers the grounded conductor 607 from relay 702 to the connecting relay 704, through contacts of the transfer relay 703. Accordingly, relay 702 falls back and disconnects the key conductors 501—504 from the relays A to D of the price-hundreds register PH, and relay 704 operates and connects these conductors to the corresponding relays of the price-tens register PT.

When the operator depresses the digit key 0 to set up the price-tens digit, a circuit is closed from ground over conductor 503 and through contacts of connecting relay 704 for relay C of the price-tens register PT. Relay C operates and locks itself at its inner armature to the grounded conductor 606 by way of the transfer relay 703. Relay 703, accordingly, energizes when the digit key 0 is restored, and it transfers the operating conductor 607 from connecting relay 704 to the connecting relay 706 by way of contacts of the transfer relay 705. Relay 704 accordingly falls back and relay 706 operates, and conductors 501— 504 are disconnected from the relays of the register PT and are connected to the relays A to D of the register PU.

When the operator depresses the digit key 4 to set up the price-units digit 4, a circuit is closed from ground through the contacts of the digit key 4 over conductors 501 and 504 for the relays A and D of the price-units register PU. These relays operate and close locking circuits for themselves at their inner armatures through the transfer relay 705 to the grounded conductor 606. As a result, when the key 4 of Fig. 5 is released, relay 705 operates and transfers the operating ground from relay 706 of the price-units register to the relay 708 of the price-fractions register PF. Conductors 501—504 are accordingly disconnected from the relays of the price-units register by the deenergization of relay 706 and are connected to the relays A to D of the register PF by the energization of relay 708.

When the fractions digit 1 (indicating ⅛) is recorded by depressing the digit key 1, relays A, B, and C of the price-fractions register PF operate over conductors 501, 502, and 503, and close locking circuits for themselves to conductor 606 by way of transfer relay 707. As a result, relay 707 operates when the digit key 1 is released, and it opens the circuit of relay 708, whereupon relay 708 falls back and disconnects the conductors 501—504 from the relays A to D of the price-fractions register PF.

*Stock-range registration*

Having recorded the stock and the price quotation, the operator indicates the stock range by depressing the stock-range key LA to cause the price quotation to be recorded as the last price. When this key is depressed, a circuit is closed from ground through the contacts of the key and over conductors 505, 506, and 507, and through contacts of relay 611 for relays A, B, and C of the stock-range register SR, relay 611 being energized from the grounded conductor 607 through contacts of relay 610. Upon operating, relays A, B, and C, of the stock-range register SR close self-locking circuits at their inner contacts through relay 610 to the grounded conductor 606. As a result, relay 610 energizes when the range key LA is released, with results to be explained hereinafter.

The registration is now complete and the result of the registration will now be taken up in detail.

*Stock translation*

Since a stock may be identified by one letter, by two letters, or by three letters, arrangements are provided for delaying the operation of any one of the stock relays of Fig. 3 until a price digit is recorded, in order to avoid the premature translation of a two-letter registration as a single-letter registration or the translation of a three-letter registration as a two-letter registration. The way the translation takes place will now be pointed out.

When the transfer relay 701, associated with the price-hundreds register PH, energizes, as hereinbefore pointed out, upon the release of a digit key of Fig. 5 following its depression for the first price digit, at its lower armature places ground from the grounded conductor 709 on the translating-start conductor 601. Ground potential is thereby extended to the upper armatures of relays ——A to ——Z of the register SR3, Fig. 2. Conductor 601 is connected to the corresponding armatures of the relays —A to —Z of the stock register SR2 in case only a two-letter designation is recorded on account of the fact that relay 205 is not energized in such case, and it is connected through contacts of relay 203 to the corresponding armatures of relays A to R of the stock register SR1 in case only a one-letter designation is recorded, as in that case the transfer relay 203 is not operated. However, in the present case a full three-letter designation is recorded and the extension of the ground potential on conductor 601 beyond the stock register SR3 is prevented by the operated upper armature of relay 205.

With relay ——A energized as before explained, the circuit continues from conductor 601 through the upper contacts of the relay ——A, contacts of the energized relay —B of the register SR2, to the conductor —BA extending to the left-hand side of the intermediate distributing frame IDF—1. A jumper on this frame connects conductor —BA to stock relay BBA. Relay BBA operates and extends a ground connection from the closed contacts of the now-operated relay B of the register SR1, Fig. 1, to the digit-1 conductor in conductor group CD1, to conductor 5 in group CD2, and to conductor 2 in group CD3.

At this point it may be conveniently explained that the frame IDF—1 permits any of the stock relays, such as 301 and 302, to be assigned to any stock, and that the frame IDF—2 permits any three-digit code to be assigned to any stock.

From the upper contacts of the twenty-six relays —A to —Z of the stock register SR2, twenty-six conductors (of which three are shown) extend to the left-hand side of the intermediate distributing frame IDF—1. The conductors shown are labeled —A, —B, and —Z. Any stock relay corresponding to a two-letter stock is connected to the one of these twenty-six conductors which corresponds to the second letter of the stock to which the stock relay is assigned, this being illustrated in connection with the stock relay 302 assigned to stock BA. In order to complete the identification of a stock relay with the stock, the contacts of the stock relay are jumpered to the one of the eighteen three-conductor sets controlled by the relays A to R of SR1 which corresponds to the first letter of the stock to which the relay is assigned. This is illustrated in connection with the said stock relay 302, whose contacts are connected on the frame IDF—1 to the B set of conductors controlled by the B relay of the stock register SR1.

The association of a stock relay with a three-letter stock is carried out in the above manner except that the relay is connected to one of the 676 conductors controlled jointly by the twenty-six register relays of the register SR2 and the twenty-six register relays of the register SR3. This is illustrated in connection with the stock relay 301, which is assigned to stock BBA, the winding of this relay being cross connected on the frame IDF—1 to the one of the 676 conductors bearing the designation —BA, corresponding to the last two letters of the stock with which the stock relay is associated.

It will be understood, of course, that there may be a plurality of stock relays connected to any one of the stock-relay-operating conductors, such as —AA and —A, terminating at the left-hand side of the frame IDF—1. When a conductor having a plurality of stock relays connected to it is grounded in order to perform the act of translation, all of the relays operate, but only the one having its contacts rendered effective by an energized one of the relays A to R of the register SR1 is effective in producing a translation. The conductor sets closed through by the remaining operated stock relays are open at the relay contacts of the stock register SR1.

It will be noted that the eighteen relays corresponding to the single-letter stocks A to R, of which the relays 303, 304, and 305 are shown, are permanently connected to the conductors controlled by the upper contacts of the relays A to R of the stock register SR1, and that the contacts of the relays, such as 303—305 are permanently grounded, so that the operation of any one of these relays alone is sufficient to cause a translation. This arrangement is advantageous in case a transmitter is being built for use in a situation where all of the single-letter stocks are handled, as the relays representing such stocks may be installed and permanently connected up at the time the transmitter is manufactured. If desired, however, these permanent connections may be omitted and stock relays such as 301 and 302 may be assigned to the single-letter stocks by appropriately connecting the four jumpers required for a stock relay to the contacts on the left-hand side of the intermediate distributing frame IDF—1 controlled by the upper and lower armatures of the relays A to R of the register SR1.

The three sets of conductors terminating on the right-hand side of the intermediate distributing frame IDF—2, and labeled CD1, CD2, and CD3, correspond, respectively, to the first, second, and third code digits in a translated-stock designation. The conductors extend to the registering relays of the groups SH, ST, and SU of Fig. 4. These groups are the hundreds, tens, and units groups, respectively.

Continuing now with the description of the translation of the stock registration BBA into the stock code 152, it was pointed out hereinbefore how, upon the energization of stock relay 301, corresponding to stock BBA, a ground potential is extended from the contacts of the operated relay B in the stock register SR1 through jumpers on the distributing frames IDF—1 and IDF—2 to the first, fifth, and second conductors in the groups CD1, CD2, and CD3, respectively. As a result, a circuit is closed over the first conductor group CD1 for the first register relay 1 of the stock-hundreds register SH; a circuit is closed over the fifth conductor of group CD2 for the fifth register relay 5 of the stock-tens register ST; and a circuit is closed through the second one of the conductors CD3 for the second relay 2 in the stock-units register SU. These relays operate and at their inner-upper armatures prepare locking circuits for themselves. When relay No. 1 in the register SH operates, and prepares its locking circuit at its inner armature, it extends its operating ground potential to relay 406. Relay 406 operates and locks itself, together with the operated register relay 1, to the grounded locking conductor 606. In the same way, register relay 5 of the stock-tens register ST, upon preparing a locking circuit for itself, closes a circuit for relay 407 which operates and locks itself and the operated register relay to conductor 606. Similarly, relay 408 of the stock register SU is operated to lock itself and the operated register relay 2 to conductor 606.

With the locking relays 406, 407, and 408 of the registers SH, ST, and SU, respectively, operated, ground potential through the contacts of these three relays in series is placed on the translation-completed conductor 409 preparing a circuit for start relay 612. This circuit is completed only after a range digit has been registered on the range register SR and relay 610 has consequently operated.

Connecting register set to sender

When the transfer relay 610 of the range register R of Fig. 6 operates as hereinbefore pointed out, it places ground at its lower armature on conductor 616 and on conductor 609, closes a circuit over conductor 609 through the lower armature of the operated transfer relay 707 of the price-fractions register PF for the relays 710 and 711 in series. These two relays energize and connect the control conductors of the registers PH, PT, PU, and PF to the corresponding conductors of the sending apparatus of Figs. 8 and 9. Relays 435 and 436, Fig. 4, operate over conductor 616 and connect the associated control conductors to the sender of Figs. 8 and 8A.

Releasing stock relay

As a further result of its operation, relay 610 opens the circuit of relay 611 at its inner-upper armature, and it completes a circuit for start relay 612 as hereinbefore pointed out. When start relay 612 operates, it removes ground at its upper armature from conductor 709, and consequently from conductor 601, which previously obtained ground potential from conductor 709 through the lower contacts of relay 701. The removal of the ground potential from conductor 601 opens the circuit of the operated stock relay 301, Fig. 3. Relay 301 falls back and opens the initial circuits of the operated register relays in the registers SH, ST, and SU, but these relays remain operated because they are locked to conductor 606 as explained.

Release of stock registers

When conductor 601 was first grounded, relay 207 was operated over conductor 601. Upon operating, relay 207 connects ground directly to conductor 250 independent of the contacts of relays 208 and 209, and at its lower armature it closes a circuit through the lower winding of relay 208, whereupon relay 208 operates and opens a point through which ground potential was initially supplied to the locking conductor 250. Conductor 250 is the conductor over which the operated relays in the register groups SR1, SR2, and SR3, are maintained locked through the transfer relays 201, 203, and 205. Now, when the ground potential is removed from conductor 601 upon the operation of start relay 612 as mentioned above, relay 207 falls back at the same time that the operated stock relay falls back. Upon falling back relay 207 removes the direct ground connection from conductor 250 at its upper armature, and at its lower armature opens the circuit of the lower winding of the operated relay 208. With relay 208 operated and with relay 207 restored, there is a ground potential on conductor 250 through the high resistance upper winding of relay 208. The resistance of the upper winding of relay 208 is relatively high, and none of the register relays of the groups SR1, SR2, and SR3, can remain operated in series with this upper winding. Relay 208, of course, having a high resistance winding with many turns, remains operated as long as any one of the register relays is operated, being energized through a register relay and the associated transfer relay in series. As soon as all of the register relays have fallen back, the circuit of the upper winding of relay 208 is open, and relay 208 immediately falls back and replaces the ground connection to conductor 250 by way of contacts of the error relay 208. By this arrangement, the locking ground potential is removed from conductor 250 as soon as relay 207 falls back, and this ground potential is replaced as soon as the register relays have restored and permitted relays 708 to fall back. In this way, the relays of the stock registers are restored and the locking ground potential is restored following the operation of start relay 612, so that the register relays can be immediately reoperated and locked to store the stock letters of the next stock to be set up.

Transfer to register set #2

As a further result of the operation of start relay 612, a circuit is closed at the lower armature of relay 612 for the upper winding of relay 615. Relay 615 operates, and at the normally-closed contacts controlled by its lower armature, opens the circuit of the lower winding of relay 614. When this occurs, relay 614 falls back, and at the normally-closed contacts controlled by its lower armature closes a holding circuit for relay 615 through its lower winding, and at about the same time removes the ground potential from conductor 607. When conductor 607 is thus ungrounded, relays 403, 404, and 405 of Fig. 4 fall back and disconnect the conductors CD1, CD2, and CD3 from the associated register relays of the registers SH, ST, and SU. Relay 615 grounds the corresponding conductor 607' extending to register set #2, thereby operating the register-connecting relays therein corresponding to relays 403, 405, 702, and 611.

As a further result of the deenergization of relay 614, and the energization of relay 615, the register locking conductor 606 is disconnected from the grounded branch conductor 101, controlled by the error relay 209, Fig. 2, and is connected to the branch conductor 618, which is now grounded in the sender through contacts of relay 942. Conductor 606' of register set #2 is transferred from branch conductor 618 to branch conductor 101.

Stock-range keys locked

Relay 612 also grounds the sender-start conductor 617, closing a circuit for the locking magnet LM associated with the stock-range keys in Fig. 5. Magnet LM energizes, and by means of a mechanical interlocking arrangement (not shown) prevents any of the stock-range keys from being depressed. This arrangement is employed to insure that the operator will not get two full numbers set up before the sender has finished sending out the first. The lamp L indicates visually that the range keys are locked.

Operation of the sender

As a further result of the grounding of the sender-start conductor 617 by relay 612, a circuit is closed over the grounded start conductor 617 and through contacts of relay 805 for pickup relay 801. Relay 801 operates and locks itself directly to the start conductor 617 at its left-hand contacts, and at its right-hand contacts it extends ground from the grounded start conductor 617 through contacts of relay 805 to the branch conductor 841, thereby rendering the interrupters 823 and 824 active to operate the synchronizing relays 819—822 to extend the operating circuits through to the counting switch CS1 of Fig. 8 and the counting switch CS2 of Fig. 9, and to connect up the sending conductors 851 to 854.

In order that the description of the operation of the sending apparatus of Figs. 8 and 9 will be understood more clearly, the arrangement of the sending apparatus and its relation to the registering apparatus will first be explained in a little more detail than hereinbefore. Upon referring to the registers shown in Figs. 4, 7, and 6, it will be noted that eight digits, all told, may be registered. The sending apparatus of Figs. 8 and 9 has been arranged to send four of the eight digits during the first of two sending periods, and to send the remaining four of the eight digits during the second of the two sending periods. The four digits sent first are the stock digits comprising stock-hundreds, stock-tens, stock-units, and stock-range digits, and they are set up on the registers SH, ST, and SU (Fig. 4), and SR (Fig. 6), respectively. The digits sent during the second sending period are the price digits registered on the register PH, PT, PU, and PF of Fig. 7. Accordingly, during the first sending period the four stock digits above named are sent out over the four outgoing conductors 851—854, respectively; and at the repeater R1, the relays respond to these digits and send positive and negative impulses over the conductors outgoing from the repeater to the receivers, such as RE1 and RE5. The digits transmitted over conductors 851 and 852 are represented by positive impulses transmitted over the conductors outgoing from the repeater to the receivers, and the digits sent out by the sender over conductors 853 and 854 are represented by interspersed negative impulses sent out by the repeater R1 over the same conductors. For this reason, the impulses are placed on conductors 851 and 852 alternately with the placing of impulses on conductors 853 and 854. By this arrangement, the relays 1001—1004 of the repeater R1 operate in such sequence that the positive and negative impulses placed on the conductors outgoing from the repeater are suitably interspersed, so that a positive impulse is transmitted over either conductor in the space between two negative impulses, and vice versa. The interspersing of the positive and negative impulses at the repeater is secured by arranging the cams 825 and 826 which send impulses over conductors 851 and 852, so that the conducting portions thereof are diametrically opposite the conducting portions of the cams 827 and 828 which send impulses over conductors 853 and 854. It will be understood, of course, that all of the cams 823—828 are on the same shaft, and that this shaft is being rotated at a suitable rate.

The respective values of the digits sent out over conductors 851 and 852 are controlled by the wipers of the counting switch CS1, which counting switch is in turn controlled by the local cam 823, positioned on the shaft in the same way as the sending cams 825 and 826. Similarly, the digits sent out over conductors 853 and 854 are controlled by the counting switch CS2, which counting switch is in turn controlled by the cam 824, positioned on the shaft in the same way as the cams 827 and 828. More, in particular, the wipers of each counting switch are divided into two sets of three wipers each, and the values of the digits sent out over the conductors 851—854 are controlled, respectively, by the four sets of wipers 813—815, 816—818, 901—903, and 904—906.

It will be noted that the bank of each of the wipers of the counting switches CS1 and CS2 is divided into two sections. The first section of the bank is used to control the value of the first digit to be transmitted under the control of the associated wiper, while the second section of the bank is used to control the value of the second digit. For example, the wipers 813—815 of the counting switch CS1 control the value of the stock-hundreds digits while they are being operated over the first half of their respective contact banks, and they control the value of the price-hundreds digits as they are being rotated over the second half of their respective contact banks, the stock-hundreds and price-hundreds digits being both transmitted out over the outgoing conductor 851.

Synchronizing the counting switches

To continue with the description of the operation of the sender following the grounding of the start conductor 617, and the consequent operation of pick-up relay 801, relay 820, of the synchronizing pair comprising relays 819 and 821, pulls up as soon as the interrupter 823 arrives in the position shown in the drawings, following the grounding of conductor 841 at the left-hand contacts of relay 801. Relay 820 operates through cam 823 and the contacts of relay 819. Upon operating, relay 820 locks itself to conductor 841, through the winding of relay 819. Relay 819 is shunted by cam 823 as long as the cam is in closed position. As soon as the cam 823 rotates to an open position, it removes the shunt from around the winding of relay 819, whereupon relay 819 operates in series with relay 820, and transfers the brush of cam 823 from in connection with relay 820 to the motor magnet 809 of the counting switch CS1 by way of contacts of relay 805. Accordingly, motor magnet 809 energizes responsive to each subsequent closure of the cam 823 and steps the wipers 813—818 one step upon each deenergization.

As soon, after conductor 841 is grounded, as the cam 824 is rotated into closed position, relay 822 of the synchronizing pair comprising relays 821 and 822 operates and locks itself to conductor 841 through relay 821. Relay 821 is shunted by the cam 824 as long as the cam remains in closed position, but it operates in series with relay 822 when the cam rotates into open position, transferring the brush of the cam from relay 822 and through contacts of relay 805 into connection with the motor magnet 910 of the counting switch CS2, Fig. 9, by way of conductor 834. As a result, the magnet of the counting switch CS2 alternately energizes and deenergizes under the control of the cam 824, and the wipers 901—906 are advanced upon each deenergization of magnet 910.

It will be seen that one of the counting switches will be moved in advance of the other, on account of the fact that the controlling cams are out of step with each other by 180 degrees. It is immaterial which counting switch advances first, and the one which advances first depends upon the position of the interrupters at the time conductor 841 is first grounded.

It will be noted that relay 819 of the synchronizing pair comprising relays 819 and 820 connects the sending cams 825 and 826 through to the outgoing impulse conductors 851 and 852 at the same time that it connects the local stepping cam 823 to the motor magnet 809 of the counting switch CS1. Accordingly, cams 825 and 826, which are connected to the grounded conductor 833 through contacts of stop relays 808 and 812, send impulses out over conductors 851 and 852 at the same time that impulses are being transmitted to the motor magnet 809 of the counting switch CS1.

In the same way, relay 821 of the synchronizing pair comprising relays 821 and 822, connects conductors 853 and 854 to cams 827 and 828, with the result that impulses are transmitted by the cams 827 and 828, out over the conductors 853 and 854, at the same time that impulses are being transmitted to the motor magnet 910 of the counting switch CS2 by the local stepping cam 824. Accordingly, in order to regulate the values of the four digits being transmitted over conductors 851—854 by the interrupters 825—828, respectively, it is merely necessary to operate the respective stop relays 808, 812, 909, and 913, when the desired number of impulses have been transmitted by the respective associated sending cams. The way this is done will now be described.

Sending the first group of digits

It will be noted that the conductors A, B, C, and D, controlled by the contacts of the registering relays in the stock-hundreds register SH are now connected through contacts of the energized relay 435 to various ones of the contacts in the first half of the bank of wipers 813—815; that the conductors A, B, C, and D of the stock-tens register ST are connected through contacts of the energized relay 435 to certain contacts in the first half of the banks of wipers 815—818; that the conductors controlled by the contacts of the stock-units register SU are connected through contacts of the energized relay 836 to certain contacts in the first half of the bank of wipers 901—903 of the counting switch CS2; and that the conductors controlled by the relays A to D of the stock-range register SR, Fig. 6, are connected through contacts of the energized relay 436 of Fig. 4, to certain contacts in the first half of the banks of wipers 904—906 of the counting switch CS2. The above-mentioned conductor sets are arranged to be grounded at the registers, according to the code shown in Fig. 19, in any one of eleven combinations corresponding to the digits 1 and 0 and the digit blank. The digits 1 to 0 are represented by series of impulses containing one to ten impulses, respectively, and the digit blank is represented by eleven impulses. The counting switches CS1 and CS2 are arranged to test the conductors in the same combinations and in the same order as indicated in Fig. 19, and to operate the respective stop relays 806, 812, 909, and 913, as the grounded combinations of conductors are located. The way these tests are performed will now be explained.

It will be recalled that an impulse is being sent out over conductor 851 by the cam 825 at the same time that the cam 823 is sending an impulse to the motor magnet 809 of the counting switch CS1. The motor magnet 809 responds to the impulse transmitted to it by attracting the associated armature and causing the pawl carried thereby to engage the adjacent notch in the ratchet wheel. Accordingly, when the impulse over conductor 851 is terminated by cam 825, and the impulse to motor magnet 809 is terminated by cam 823, motor magnet 809 deenergizes and permits the armature thereof to be retracted, advancing the wipers 813—818 one step in a clockwise direction into engagement with the first contact in their respective banks. The first contact in the bank of wiper 815 is connected to the A conductor of the group controlled by the stock-hundreds register SH of Fig. 4; the first contact in the bank of wiper 814 is connected to the B conductor in the said group; and the first contact in the bank of wiper 813 is connected to the C conductor in the said group, all in accordance with the code table shown in Fig. 19. The first contacts in the bank of wipers 818, 817, and 816, are similarly connected with respect to the A, B, and C conductors of the group ST controlled by the register ST of Fig. 4.

Now, the first register relay 1 in the stock-hundreds register SH has been operated, as hereinbefore pointed out, to register the first digit 1 in the translated stock code 152. Accordingly, conductors A, B, and C in the conductor group controlled by the register SH are grounded. That being the case, relay 806 operates through wiper 813 and over the C conductor of the group, and through contacts of the first relay in the register SH, closing a point in the circuit of stop relay 808. Relay 807 is simultaneously operated through wiper 814 and the first associated bank contact and over the B conductor of the group, through contacts of the said relay 1 in the register SH. With relays 806 and 807 both operated, and with the A conductor of the group grounded as above pointed out, a circuit is completed for the stop relay 808 from the said grounded A conductor through the first contact in the bank of wiper 815, and the contacts of the energized relays 806 and 807. Relay 808 operates and locks itself to conductor 831, grounded through the back contact of the left-hand armature of relay 805. This operation of relay 808 occurs while the cams 823, 825, and 826 are in open condition. At its outer armature, relay 808 disconnects the grounded conductor 833 from the brush of the cam 825, thereby terminating the transmission of impulses over conductor 851, after only one impulse has been transmitted thereover in accordance with the first registered digit of the translated stock code 152. At its middle armature, relay 808 prepares a circuit, to be later closed, for relay 805.

Since the stop relay 808 is operated, the further advance of the wipers 815, 814, and 813 is without effect, and relay 808 remains operated and locked to the said grounded conductor 831 until the other three digits being transmitted are terminated.

The stock-tens digit, registered on the stock-tens register ST of Fig. 4, is the digit 5, and the fifth register relay of the register ST is energized as hereinbefore explained. Accordingly, the B and C conductors of the set ST connected to certain ones of the contacts in the first half of the banks of wipers 818, 817, and 816, are grounded. Accordingly, relays 811 and 810 are operated through wipers 817 and 816 over the grounded B and C conductors of the group ST upon the first step of the counting switch CS1, and a circuit is prepared for stop relay 812, but relay 812 does not operate at this time on account of the fact that the A conductor, with which wiper 18 is now making engagement, is not grounded. All contacts in the first half of the bank of wiper 816, beyond the first, are grounded locally as shown, with the result that relay 810 remains energized, through succeeding steps of the counting switch, until the entire digit has been transmitted.

Upon the second step of the wipers, a test is made for the combination A and B by the wipers 817 and 818, and relay 811 again prepares a circuit through contacts of the operated relay 810 for relay 812, but relay 812 does not operate for the reason that the A conductor is not grounded as above pointed out.

As will be seen upon an inspection of the drawings, the counting switch CS1 continues to advance step-by-step without relay 812 being able to operate until the wipers arrive on the fifth set of bank contacts. When this occurs, relay 811 is energized over wiper 817, the fifth contact in the bank thereof, and the grounded C conductor; and it connects wiper 818 through contacts of the energized relay 810 to relay 812. Relay 812 now energizes over wiper 818 by way of the grounded conductor B, and it closes a locking circuit for itself at its inner armature to the grounded conductor 831. At the same time, relay 812 disconnects the grounded conductor 833 from the brush of the cam 826, terminating the transmission of impulses over the conductor 852 after five impulses have been transmitted thereover.

Considering now the transmission of the stock-units and stock-range digits by the cams 827 and 828 of Fig. 9 under the control of the counting switch CS2, it will be recalled that the units digit of the translated stock code is 2 (code 152), and that the stock-range key depressed was the key LA in order to cause the transmitted quotation to be set up as the last price. Upon referring to Fig. 5, it will be noted that the range digit LA is transmitted as the digit 1, the key combination being the same as the key combination of the first digit key. Accordingly, conductors A, B, and C of the group SR controlled by the stock-range register SR of Fig. 6, are grounded, and the conductors A and B of the stock-units group SU are grounded by the second relay in the stock-units register SU, Fig. 4. Upon the first step of the wipers 901—903, ground is encountered by wipers 902 and 903 and relay 908 operates as a result, but relay 907 is unable to operate owing to the fact that the C conductor of the group SU is ungrounded. On the second step of the wipers 901—903, relay 907 is operated because wiper 901 engages the first of the nine locally-grounded contacts in the first half of its bank. Relay 908 operates through the second contact in the bank of wiper 902 and over the grounded B conductor. At this time, a circuit is completed for stop relay 909 from the grounded A conductor of the group SU, through the second contact in the bank of wiper 903 and the said wiper, and through contacts of the energized relays 908 and 907. Upon operating, relay 909 locks itself to the grounded conductor 831 at its inner armature; and at its outer armature it disconnects the grounded conductor 833 from the brush of the cam 827, terminating the transmission of impulses over conductor 853 after two impulses have been transmitted thereover.

Upon the first step of the wipers 904—906, relays 911, 912, and 913 all operate on account of the fact that conductors A, B, and C of the group SR are grounded by the stock-range register, Fig. 6, terminating the transmission of the range digit LA (or 1) over conductor 854 after only one impulse has been transmitted. Upon operating, relay 913 locks itself to the grounded conductor 831 at its inner armature, and at its outer armature disconnects ground potential from the brush of cam 828 so as to effect the said stopping of the transmission of the range digit. It will be recalled that the digit having the highest value in the first group transmitted, is the digit 5, and that this digit is the tens digit controlled by wipers 816—818 of the counting switch CS1. Accordingly, relay 812 is the last of the stop relays 808, 812, 909, and 913 to operate. Upon the operation of relay 812 at the above-described termination of the tens digit 5, a circuit is completed through contacts of relays 913, 909, and 907, conductor 832, and contacts of relays 812, 808, and 806, or relay 805. Upon operating, relay 805 closes a locking circuit for itself at its inner left-hand armature through contacts of the slow-acting timing relay 804, at the same time opening the circuit of the said timing relay. Relay 804 requires a slight interval of time (preferably a fraction of a second) to fall back and again open the circuit of relay 805. It is during this interval that the wipers of the counting switches CS1 and CS2 are advanced over the remaining contacts in the first half section of their respective banks and positioned in readiness to transmit the second group of digits. The way in which this is accomplished will now be pointed out.

As a further result of its operation, relay 805 opens the locking circuits of relays 808, 812, 909, and 913, at its left-hand armature, and at its inner right-hand armature it removes ground from conductor 833, thereby preventing the premature reapplication of ground potential through the interrupters 825—828 to conductors 851—854. As a still further result of its operation, relay 805 disconnects the motor magnets 809 and 910 of the switches CS1 and CS2 from the interrupters 823 and 825, and connects these motor magnets in separate self-interrupting circuits. The self-interrupting circuit of motor magnet 809 includes the self-interrupting contacts of the magnet, contacts of relay 805 and the wiper 816, which engages grounded bank contacts in each of its first-section positions beyond the position used to terminate the digit 1. The motor magnet 809 operates in a buzzer-like manner in the circuit above pointed out, and advances the wipers 813-818 very rapidly in clockwise direction until wiper 816 passes beyond the last grounded contact in the first section of its bank and arrives upon the following ungrounded contact. When this occurs, the motor magnet 809 ceases to operate and the relays 806—808 and 810—812 are all deenergized.

The circuit for advancing the counting switch CS2 by means of its motor magnet 910 is similar to the one just described except that it includes wiper 904 of the counting switch CS2 in place of the wiper 816 of the counting switch CS1. The counting switch CS2 is advanced by the buzzer-like action of the motor magnet 910 until wiper 904 passes beyond the last grounded contact in the first section of its bank. At this time, all of the relays 907—909 and 911—913 are deenergized.

As a still further result of its operation, relay 805 disconnects the grounded start conductor 617 from the branch conductor 841, ungrounding the operating interrupters 823 and 824 and opening the locking circuit of relays 819—822. Relays 819—822 accordingly fall back. Relay 805 also closes a circuit at its outer armature through the inner contacts of relay 802 for relay 803. Relay 803 of the counting pair comprising relays 802 and 803 operates and closes a locking circuit for itself through the winding of relay 802 and through the left-hand contacts of pick-up relay 801 to the grounded start conductor 617. This locking circuit does not become effective and relay 802 does not operate as long as the initial circuit of relay 803 remains closed at the outer armature of relay 805.

Sending the second group of digits

When the slow-acting timing relay 804 falls back at the end of the interval for which it is adjusted, it opens the locking circuit of relay 805, whereupon relay 805 falls back and opens a further point in its locking circuit, and again closes the operating circuit for relay 805. Upon falling back, relay 805 again places the counting switches in position to operate, and at its outer armature it opens the initial circuit of relay 803 and again extends the grounded start conductor 617 to conductor 841 to bring about a reoperation of the synchronizing relays 819—822. When the initial circuit of relay 803 is opened, the locking circuit of this relay becomes effective, and relay 802 energizes in this locking circuit and opens a further point in the initial circuit at its inner armature. At its outer armature, relay 802 prepares a circuit over conductor 837 for subsequently operating the register-unlocking relay 942.

The synchronizing relay-pairs 819 and 820, and 821 and 822, are again operated by the cams 823 and 824 to extend operating circuits from these cams to the motor magnets 809 and 910 of the counting switches CS1 and CS2. The conductors controlled by the relays in the price registers PH, PT, PU, and PF of Fig. 7, are connected to bank contacts in the second section of the banks of the wipers of the counting switches CS1 and CS2 in accordance with the code shown in Fig. 19, with the result that the counting switches control the values of a second group of digits transmitted over conductors 851—854 to conform to the registered price digits 1, 0, 4, and 1. The contacts in the second section are connected up in the same combinations as the contacts in the first section, and it is thought that an inspection of the connections of the conductors to the contacts of the banks of the counting switches, together with a comparison of these connections with the code table shown in Fig. 19, will enable an understanding to be had of the exact way in which the digits of the second group are respectively terminated. It will, however, perhaps be illuminating to go into a little more detail in the case of the price-tens digit 0, as this digit may be taken as typical of the four digits 8 to 0 and blank, which are each represented by a single character in the code shown in Fig. 19. The price-tens digit 0 of the present price 1041 is handled by the wipers 816—818 of the counting switch CS1, the test contacts in the second section of the bank of these wipers being connected to the A, B, C, and D conductors controlled by the price-tens register PT of Fig. 7.

As explained hereinbefore, the energization of a stop relay, such as the stop relay 812, to terminate the transmission of impulses by the associated cams such as 826 is dependent upon the simultaneous encountering of ground potentials by all three associated wipers such as 816, 817, and 818. This provision is made necessary because the digit 1, as indicated in Fig. 19, is represented by three characters (A, B, and C). Accordingly, the first contact in a bank section of each of the three associated banks of the counting switch is connected to a separate one of the conductors A, B, and C, as shown in the drawings. In this case, if the digit 1 is set up, ground potential is encountered by all three wipers and the digit is terminated after one impulse has been transmitted. If the test for the digit 1 is unsuccessful, the wipers continue to advance, but wiper 16 makes no further test of any of the conductors A to C because no digit other than 1 is represented by more than two characters. Accordingly, the remaining tests can be taken care of by wipers 817 and 818, and wiper 816 engages locally-grounded contacts beyond the first step.

Upon examining Fig. 19 still further, it will be noted that the digits 2 to 8 are represented by two characters each, and that the digits 8 to 0 and blank are represented by a single character each. Accordingly, wipers 817 and 818 jointly test over the contact sets 2 to 7 to secure the operation of stop relay 812 if the digit registered happens to be any one of these digits.

In case the registered digit has not been located by the testing wipers by the time they have passed beyond the position assigned to the seventh digit, all assigned combinations of more than one test conductor have been exhausted, and the digit registered has been narrowed down to one of the four digits 8, 9, 0, and blank, represented by a single character each. Accordingly, the eighth, ninth, tenth, and eleventh-position contacts in the bank of wiper 817 are locally grounded, and the tests of the conductors A to C are made by the wiper 18 alone. The conductors are tested in regular order in positions 8 to 0 and 11, in accordance with a table in Fig. 19. As a result, when wiper 818 encounters the grounded conductor C in position 0, relay 812 is operated through contacts of the locally-operated relays 810 and 811 to terminate the price-tens digit 0.

Since the tens digit (0) has the highest value in the second group, by the time stop relay 812 has operated to terminate the price-tens digit 0, stop relays 808, 909, and 913 have already been operated, and a circuit is completed at the middle armature of relay 812 for relay 805. When relay 805 operates at this time, it unlocks the stop relays 808, 812, 909, and 913, and closes the hereinbefore-described self-interrupting circuits for the motor magnets 809 and 910 through wipers 816 and 904 to cause the counting switches CS1 and CS2 to restore to the normal position shown in the drawings, and it completes a locking circuit for itself and opens the circuit of the slow-acting timing relay 804, as before explained.

*Clearing out the transmitter*

Relay 805 also closes, at its outer right-hand armature, a circuit through contacts of relay 802, and over conductor 837, for release relay 942. Relay 942 operates and removes the locking ground potential from conductor 618 and makes a further ground connection to conductor 620. It will be recalled that locking conductor 606 has been supplied with ground potential from conductor 618 since relay 615 operated and relay 614 fell back. The locked-up register and transfer relays of register set #1 now release and return to the normal position shown in the drawings. Upon the release of the transfer relay 610 of the stock-range register SR, ground potential is removed at the lower armature of relay 610 from the connecting conductors 616 and 619. As a result, connecting relays 435, 436, 710 and 711 fall back. Relay 610, upon releasing, also opens the circuit of start relay 612, whereupon relay 612 falls back and removes potential from start conductors 617. At this time, relays 801—803, and 819—822, Fig. 8, fall back. Also the circuit of the left-hand winding of release relay 942 is opened, but this relay, being similar to the release relay 208 of Fig. 2, is maintained operated through its high-resistance right-hand winding, over locking conductor 617 in series with one or more of the register relays of Figs. 4, 7, and 6, until all of the register relays have been released. As soon as all of the register relays are released, release relay 942 falls back and replaces ground potential on locking conductor 618.

With relays 610 and 942 both released, the locking magnet LM associated with the stock-range keys is unlocked, and the operator is able to depress one of these keys to secure a stock-range registration.

At the end of the interval for which it is adjusted, slow-acting timing relay 804, Fig. 8, falls back and breaks the circuit of relay 805. Relay 805 falls back and connects pick-up relay 801 to start conductor 617 so that pick-up relay 801 may operate and start the sending apparatus to functioning again in case start conductor 617 has, in the meantime, become grounded in register set #2.

*Setting the register set #2*

When the operator depresses her keys for the next number, relays in the stock registers of Fig. 2 are operated as before, and a transfer of the stock indication to the stock translating equipment of Fig. 3 takes place as described. In this case, however, since relay 615 has been energized and relay 614 deenergized to ground connecting conductor 607' in place of 607, the stock code is transferred to register set #2, by way of the conductors in the cable 603, through contacts of relays in register set #2 corresponding to relays 403, 404, and 405 of Fig. 4.

When the start relay (not shown) in register set #2, corresponding to relay 612 in register set #1, operates to ground start conductor 617, it closes a circuit for the upper winding of relay 614 through contacts of the relay corresponding to relay 610, and relay 614 becomes energized again and relay 615 falls back. It will be noted that the several branches of the conductors A, B, C, and D of Fig. 8 are multipled by means of cable 619 to the register set #2 so as to enable the sending apparatus of Fig. 8 to operate from the register set #2.

*General arrangement of the system*

Referring now particularly to Fig. 10, the general arrangement of the system will now be explained. Since, as will be recalled, the transmitting apparatus is in two parts, each of the two operators having her own transmitter, the receiving apparatus is provided in two parts, a separate receiver being arranged to receive stock quotations as transmitted by each of the operators. Two receivers, such as RE1 and RE2 are installed in each broker's office, together with a common indicating board. The transmitter T1, shown in Figs. 1 to 9 is used, as before mentioned, to handle quotations of stocks A to R and of stock designated by more than one letter of which the first letter is any one from A to R.

In Fig. 10 there is shown a transmitter T2 which may be substituted for the transmitter T1 by the operation of the transfer key TK1. This spare transmitter is provided so that, in case something goes wrong with the one in use, the operator may immediately operate the key TK1 and proceed with the spare transmitter.

The transmitter T3 is the one used by the second operator and is the same as the transmitter T1 except that the stock register in the transmitter T3 corresponding to the stock register SR1, Fig. 2, is arranged to take care of the letters J to Z instead of the letters A to R, the letters J to R being common first letters to both operators so that sufficient flexibility is secured in shifting the line of stock division from one operator to another from time to time as changes may occur in the relative activity of the stocks.

Impulses are sent to the repeater R1 by either of the transmitters T1 or T2, depending upon the position of the transfer key TK1, and impulses are sent to the repeater R2 by either of the transmitters T3 or T4, of the second operator, depending upon the position of the associated transfer key TK2. The receiver pairs, such as RE1 and RE2, are grouped according to location, with about fifteen pairs, for example, in each group. Four control wires, two from each repeater, extend to the first pair of each group, and the last pair of each group is grounded as indicated in the drawings.

*Repeating the digit impulses*

The impulses delivered over conductors 851—854 to the repeater R1 are repeated over outgoing conductors to the receiver groups, being repeated to the receiver group illustrated over conductors 1005 and 1006. The impulses received over conductors 851 and 852 are repeated by relays 1001 and 1002 over conductors 1005 and 1006, respectively, as positive impulses, while the impulses received over conductors 853 and 854 are repeated as interspersed negative impulses; the impulses over conductors 853 and 854, it will be recalled, are 180 degrees out of phase with the impulses over conductors 851 and 852.

*Operation of the receiver*

Figure 14:
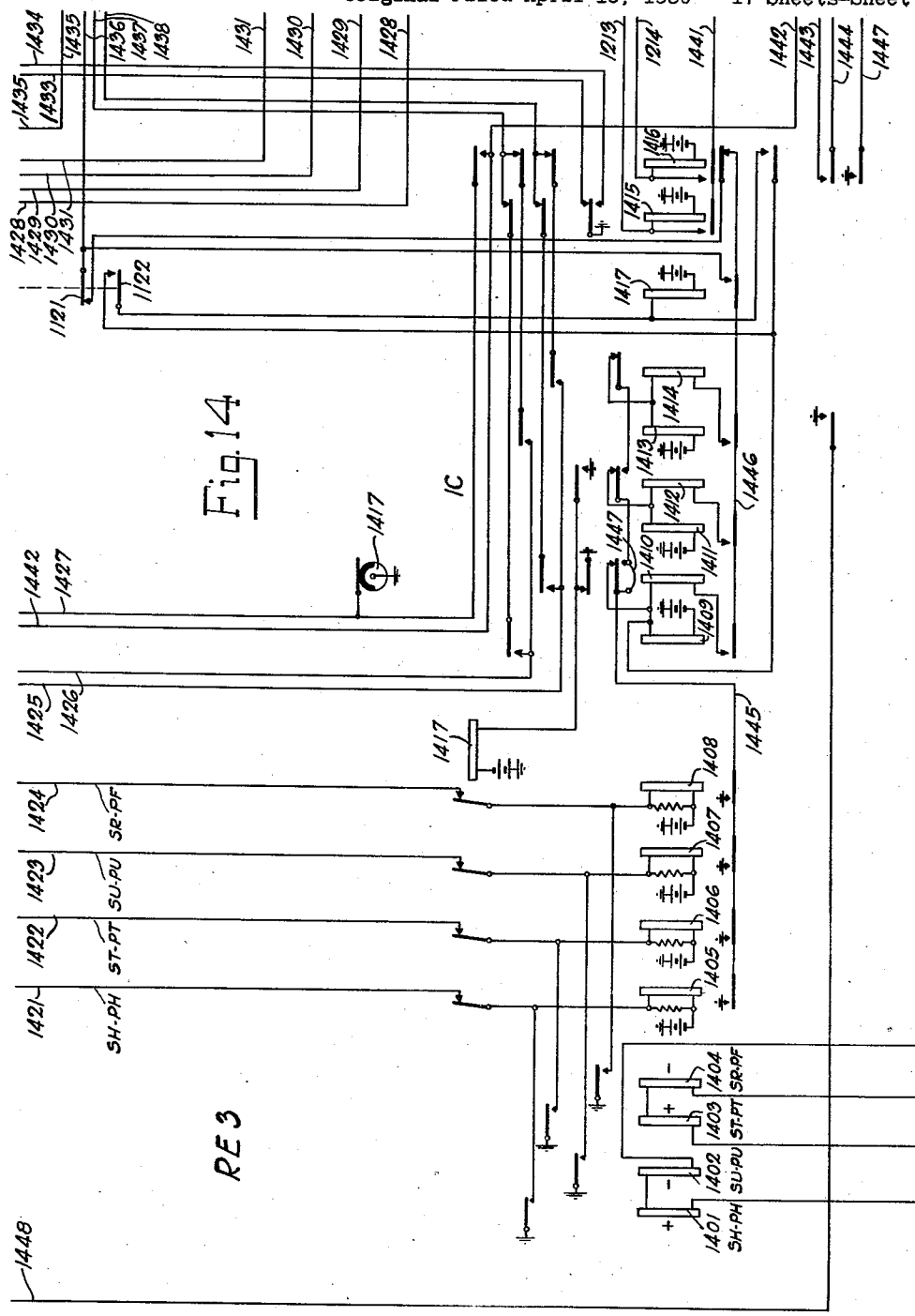

Referring now to Figs. 11–16, the operation of the receiver RE3, shown therein, will now be described. By means of conductors 1021 and 1024, the oppositely-polarized relays 1401 and 1402 of Fig. 14, are connected in series with the corresponding relays in the other receivers of the group, so that they receive the impulses transmitted over conductor 1005 of the repeater R1, Fig. 10. In a similar way, the oppositely-polarized relays 1403 and 1404 are connected by means of the conductors 1022 and 1023 in series with the corresponding relays in the other receivers, so that they receive the impulses transmitted over conductor 1006 from the repeater R1 of Fig. 10. It will be recalled that eight digits, all told, are transmitted, and that these digits are transmitted in two groups, the stock digits being transmitted in the first group, and the price digits being transmitted in the second group. It will be recalled that the stock-hundreds digit is transmitted over conductor 1005 by means of positive impulses, repeated by the repeating relay 1001; that the stock-units digit is transmitted over the same conductor (1005) by the repeating relay 1003 of the repeater R1, and is represented by negative impulses interspersed with the positive impulses representing the stock-hundreds digit; that the stock-tens digit is transmitted over conductor 1006 by the action of repeating relay 1002, which sends positive impulses; and that the stock-range digit is transmitted over conductor 1006 by repeating relay 1004 of the repeater R1, which repeating relay sends negative impulses interspersed with the positive impulses transmitted by relay 1002.

Since the relays 1401 and 1402 are oppositely polarized as indicated by the plus and minus signs adjacent thereto, respectively, relay 1401 responds to each of the positive impulses representing the stock-hundreds digit, and relay 1402 responds to each of the negative impulses representing the stock-units digit. In the same way, the positively-polarized relay 1403 responds to the positive impulses representing the stock-units digit, and the negatively-polarized relay 1404 responds to the negative impulses representing the stock-range digit. It will be recalled that the registration of the stock letters B, B, and A have been translated into the stock-code digits 1, 5, and 2, and that the range digit 1 was transmitted to indicate that the price quotation is to be set up as the last price. Accordingly, relay 1401 operates once in accordance with the stock-hundreds digit 1; relay 1403 operates five times in accordance with the stock-tens digit 5; relay 1402 operates twice in accordance with the stock-units digit 2; and relay 1404 operates once in accordance with the stock-range digit 1 (LA).

It will be noted that the relays 1401—1404 directly control the circuits of the relays 1405—1408, respectively. Each of the relays 1405—1408 has a relatively non-inductive shunt placed around its winding, as shown, enabling a local circulating current to be set up through the winding of the relay when the circuit thereof is opened, enabling the relay to remain operated between the impulses of the series. As a result, all of the relays operate at the start of the transmission of the group of digits, and at least one of them always remains operated until the digit (or digits) of highest value has been transmitted. In this case, the digit of the highest value is the stock-tens digit 5, and relay 1406 is, therefore, maintained operated by the intermittent energizations it receives from relay 1403, which responds to each of the five impulses in the stock-tens digit. The relays 1405—1408 are arranged to ground conductor 1445 to control the input-control device IC comprising relays 1409—1414. As soon as conductor 1445 is grounded by one or more of the relays 1405—1408 at the beginning of a digit, a circuit is closed over conductor 1445 for relay 1409 through contacts of relay 1410, and a branch circuit is closed through the jumper 1447 and contacts of relay 1412 for relay 1411. Relay 1409 operates and at its lower armature locks itself to the grounded conductor 1446 through the winding of relay 1410, conductor 1446 being grounded through the contacts of relay 1416, resting contacts and armature 1121 of relay 1119, conductor 1436, and contacts of the special release relay 1650, Fig. 16. Relay 1410 does not operate in this locking circuit as long as the original circuit over conductor 1445 for relay 1409 remains closed, being supplied with ground potential at both terminals. Relay 1411 locks itself to the grounded conductor 1446 through the winding of relay 1412. At its upper armature, relay 1409 places ground potential on the register-locking conductor 1426, from the grounded conductor 1437 by way of contacts of relay 1415, conductor 1437 also being grounded through contacts of release relay 1650, Fig. 16. The placing of ground potential on locking conductor 1426 enables the relays in the registers of Fig. 11 to operate to record the digits, in a manner now to be described.

When relay 1401 operates a single time in response to the single impulse received over conductor 1021 indicative of the stock-hundreds code digit 1, it closes a circuit for relay 1405 as above pointed out. A branch circuit extends through contacts of the normally-operated relay 1417 and over conductor 1421 to the first counting relay 1101 of the register SH—PH by way of contacts of relay 1102. Relay 1101 operates and locks itself at its upper armature through 1102, and through the resting contact and inner-lower armature of relay 1110, to the locking conductor 1426, grounded by relay 1409 as above pointed out. Relay 1102 is short circuited by ground potential applied to both terminals as long as the impulse delivered over conductor 1421 to relay 1101 endures. Upon the termination of this impulse, relay 1102 operates from the grounded conductor 1426 in series with relay 1101 and transfers the impulse conductor 1421 from relay 1101 to relay 1103. In the present case, only one impulse is delivered and only relays 1101 and 1102 of the register SH—PU are operated. At its lower armature, relay 1102 makes a connection to the B conductor of the group 1131 in accordance with the receiver code shown in the table, Fig. 20, so that the registered digit will be transferred, by control exercised over the conductor group 1131, to the stock-hundreds storage group, SH, Fig. 12, in a manner to be subsequently explained.

It will be noted that the registers ST—PT, SU—PU, and SR—PF are indicated only by dotted rectangles. Each of these registers is the same as the register SH—PH. Accordingly, the register ST—PT responds to the five impulses delivered thereto over conductor 1422 and registers the stock-tens digit 5; the register SU—PU responds to the two impulses delivered to it over conductor 1422 and registers the stock-units digit 2; and the register SR—PF responds to the single impulse delivered thereto over conductor 1424 and registers the stock-range digit 1.

As soon as all of the impulses constituting the first group of digits have been received, and all of the relays 1405—1408 have fallen back, ground potential is removed from conductor 1445, opening the initial circuit of relays 1409 and 1411. When this occurs, relay 1410 energizes in series with relay 1409, and relay 1412 energizes in series with relay 1411. At its upper armature, relay 1410 places ground potential on the transfer conductor 1425 from the grounded conductor 1438, which latter conductor is grounded through contacts of the special-release relay 1650. The placing of ground potential on conductor 1425 results in the transfer of the digits registered on the four registering devices of Fig. 11 to the storage devices SH, ST, SU, and SR of Fig. 12. This transfer is made in accordance with the receiver code as given in Fig. 20. It will be recalled that the digit 1 is registered in the register SH—PH of Fig. 11 by the energization of the first pair of counting relays 1101 and 1102. Accordingly, when conductor 1425 is grounded, ground potential is extended through contacts on unoperated relays 1112, 1108, 1106, and 1104, and through the lower armature of the operated relay 1102 to conductor B of the set 1131. The conductor sets 1131—1134 are normally extended to the upper row of storage relay groups of Fig. 12 through contacts of relays 1201 and 1202, which are normally energized over conductor 1433 as shown through contacts of relay 1415. That being the case, placing ground potential on the B conductor of set 1131 closes a circuit over this conductor and through contacts of relay 1201 for the B relay of storage group SH. Since the stock-tens digit 5 is registered on the register ST—PT, the contacts of the counting relays (not shown) in this register are arranged so that when ground potential is applied to transfer conductor 1425, the A conductor of the set 1132 is grounded, closing a circuit through contacts of the operated relay 1201 for the A relay of the stock-tens storage group ST. In the register SU—PU, the stock-units 2 is recorded by the energization of the first two pairs of counting relays, and the placing of the ground potential on transfer conductor 1425 causes the C conductor of group 1133 to become grounded, closing a circuit for the C relay of the stock-units group SU of Fig. 12, through contacts of the energized relay 1202. Since the stock-range digit 1 is registered on the register SR—PF, the placing of ground potential on transfer conductor 1425 causes a ground potential to be extended over the B conductor of set 1134 and through contacts of the operated relay 1202 for relay B of the stock-range storage group SR. It will be understood, therefore, that relay B of the storage set SH of Fig. 12, relay A of the storage set ST, relay C of the storage set SU, and relay B of the storage set SR all energized simultaneously. Each of these relays prepares a locking circuit for itself at its inner armature to conductor 1213, extending ground potential to conductor 1213 by way of their initial operating circuits. When ground potential is placed on conductor 1213, a circuit is closed for relay 1415 of Fig. 14. Relay 1415 operates and closes a locking circuit for itself and completes the locking circuits for the above-mentioned energized relays in the registers SH—SR, Fig. 12, by grounding conductor 1213. Conductor 1441, it may be pointed out, is grounded through contacts of relay 1524, Fig. 15, conductor 1441' and contacts of release relay 1650.

As a further result of its energization, relay 1415, at its middle-upper armature, removes the original ground connection from transfer conductor 1425, and at its upper armature it removes ground potential from the register locking conductor 1426. All of the operated relays in the registers of Fig. 11 now restore to the normal position shown in the drawings, as the registered stock digits have now been transferred to the upper row of storage devices of Fig. 12. As a further result of its energization, ralay 1415 disconnects ground potential from conductor 1433 and places ground potential on conductor 1434. Relays 1201 and 1202 of Fig. 12 fall back and disconnect the conductor sets 1131—1134 from the stock-digit storage devices, and relays 1203 and 1204 operate over the grounded conductor 1434 and connect the said conductor sets 1131—1134 to the price-digit storage devices PH—PF.

*Detailed operation of the register SH—PH*

Before the further description of the operation is proceeded with, the detailed description of the operation of the register SH—PH of Fig. 11 will be given so that it will be seen exactly how this register, as well as the other registers of Fig. 11, records any one of the digits 1 to 0 and blank (Bl.) and translates such digit into the receiver code of Fig. 20.

It has been explained hereinbefore how relay 1101 responds to the first impulse delivered to the register SH—PH over the operating conductor 1421 from the receiving relay 1401 and locks itself through relay 1102 to the locking conductor 1426, which becomes grounded immediately upon the receipt of the first impulse by the energization of relay 1409. It has been pointed out also that relay 1102 is short circuited as long as the first impulse over the conductor 1421 endures, so that relay 1102 does not operate in series with relay 1101 until the termination of the first impulse. Upon operating, relay 1102 transfers conductor 1421 through contacts 1104 to relay 1103. As a result, relay 1103 responds to the second impulse over conductor 1421 and locks itself to the locking conductor 1426 through relay 1104. Relay 1104, therefore, energizes in series with relay 1103 upon the termination of the second impulse and transfers the operating circuit to the next pair of counting relays. In a similar way, relays 1105 and 1106 respond to the third impulse received over conductor 1421; relays 1107 and 1108 respond to the fourth impulse; and relays 1109 and 1110 respond to the fifth impulse.

It has been explained hereinbefore that relay 1102 prepares a circuit from conductor 1425 for grounding the B conductor of the set 1131 when conductor 1425 is grounded at the end of the first group of digit impulses. It will now be noted that relay 1104 at its lower armature shifts the connection from conductor B to conductor C; that relay 1106 shifts the connection from conductor C to conductor D; and that relay 1108, upon responding at the end of the fourth impulse, makes a connection between conductor C of the group and the transfer conductor 1425, in addition to the connection made to conductor D through contacts of relay 1106, all in accordance with the receiver code as shown in Fig. 20.

Now, when relay 1110 operates at the end of the fifth impulse, in a series of five or more impulses delivered over conductor 1421, it opens the locking circuit of relays 1101—1108 at its lower armature, permitting these relays to fall back. Relays 1109 and 1110 remain operated from the grounded conductor 1426 through the lower armature, normal, of relay 1111. As a further result of its operation, relay 1110, at its inner-lower armature, closes a circuit through contacts of relay 1112 for relay 1111. Relay 1111 operates and locks itself to conductor 1426 through relay 1112. At its lower armature, relay 1111 opens the circuit of relays 1109 and 1110, and again connects the grounded conductor 1426 to the branch conductor over which relays 1101—1108 were formerly locked. Relays 1101—1108 are now, therefore, in condition to be reoperated, and relays 1109 and 1110 fall back. Upon falling back, relay 1110 opens the initial circuit for relay 1111, whereupon relay 1112 energizes in series with relay 1111 and again prepares the locking circuit for relays 1109 and 1110 at its inner-lower armature. With relay 1112 energized, and with relays 1101—1110 deenergized, a connection from the transfer conductor 1425 exists to the A conductor of the group 1131 in accordance with the table shown in Fig. 20, through the lower armature, normal, of relay 1110, the lower armature, normal, of relay 1108, the lower armature, operated, of relay 1112, and the armature of relay 1113.

In case the series of impulses being received contains more than five impulses, the sixth impulse received over conductor 1421 reoperates relay 1101 and the locking circuit for this relay through relay 1102 is again closed, with the result that relay 1102 operates in series with relay 1101 at the end of the sixth impulse and makes a connection to the B conductor from the transfer conductor 1425, in accordance with the table of Fig. 20. The A and B conductors of the set 1131 are both now connected to conductor 1425. In a similar manner, relays 1103 and 1104 are operated upon the receipt of the seventh impulse of the series, and relay 1104 switches the connection from the B conductor to the C conductor so that the conductors A and C are connected up in accordance with Fig. 20; relays 1105 and 1106 are operated when the eighth impulse is received, and conductors A and D are connected up; relays 1107 and 1108 are operated when the ninth impulse is received, and the B and C conductors are connected up; relays 1109 and 1110 are reoperated when the tenth impulse is received, and the B and D conductors are connected up in accordance with the table shown in Fig. 20; and relay 1113 operates upon the receipt of the eleventh impulse in the series, in case the full number is received. Upon operating, relay 1113 connects up the A conductor, in addition to conductors B and C, and the A, B, and C conductors are connected now to the transfer conductor 1425.

From the foregoing, it will be seen that for each valve of a series of impulses from one to eleven a different combination of the associated conductors of group 1131 is connected up, so that any received digit is properly identified on a storage device of Fig. 12.

*Receiving the price digits*

When the price digits 1, 0, 4, and 1 are received by the receiving relays 1401, 1403, 1402, and 1404, respectively, the impulses are repeated, as before, through contacts of the energized relay 1417 and over conductors 1421—1424 to the registers of Fig. 11. Accordingly, these digits are set up on the registers, and the proper ones of the conductors in group 1131—1134 are connected to the transfer conductor 1425 as indicated by the table, Fig. 20.

The slow-acting relays 1405—1408 respond as before to ground conductor 1445 at the beginning of the group of digits, closing a circuit through contacts of the operated relays 1401 and 1412 and through contacts of the unoperated relay 1414 for relay 1413. Relay 1413 operates and locks itself to conductor 1446 through relay 1414, and at its upper armature ground conductor 1426 to provide locking circuits for the register relays.

When conductor 1445 is ungrounded upon the termination of the digit of the group of highest value (the tens digit 0) by the falling back of relay 1407, relay 1414 energizes in series with relay 1413, and at its upper armature again places ground potential on transfer conductor 1425 from the grounded conductor 1438 through contacts of relay 1416. Since the connecting relays 1201' and 1202' of Fig. 12 are now energized over the grounded conductor 1434 in place of relays 1201 and 1202, which change was made, as before described, upon the energization of relay 1415, the placing of ground potential at this time upon transfer conductor 1425 causes the registered price digits 1, 0, 4, and 1 to be transferred to the relays of the storage group PH, PT, PU, and PF, Fig. 12. In the register PH, relay B is operated; in the register PT, relays B and D are operated; in the register PU, relays C and D are operated; and in the register PF, relay B is operated. When these relays operate, each of them prepares a locking circuit for itself at its inner armature, extending ground potential through conductor 1214. Ground potential on conductor 1214, operates relay 1416 to close a locking circuit for itself and for the operated relays in the registers PH—PF, from the grounded conductor 1441 in multiple with the operated relay 1415. As a further result of its operation, relay 1416, at its middle-upper and inner-upper armatures, removes ground potential from the locking and transfer conductors 1426 and 1425, whereupon the registers of Fig. 11 are released. Relay 1416 also ungrounds conductor 1446, releasing relays 1409—1414.

Selecting the stock

It will be recalled that conductor 1434 was grounded upon the operation of relay 1415 when the stock digits were transferred to the storage devices SH to SR, thereby grounding the apexes of the contact pyramids of these storage devices so as to make the necessary stock and stock-range selection. For the purpose of identifying the stock register group on which the received price quotation is to be recorded, ten hundreds relays 1301 and 1302 to 1310, Fig. 13, are provided, three of these relays being shown. From the contact pyramid of the relays A to D of the storage group SH there extend ten conductors, each corresponding to a different hundreds. Between Figs. 12 and 13, these ten conductors are represented by the single line 1204. Only one of these conductors becomes grounded in the given case. In this case, since it is the B relay that is operated, in accordance with the code digit 1, the ground potential is extended, upon the grounding of conductor 1434, to the #1 hundreds conductor, operating the first hundreds relay 1301. This relay connects the stock-tens through to the upper portion of the cross-connecting rack CCR, shown in Fig. 13.

In order to make a selection as to the stock-tens, there are ten conductors (represented by line 1205) extending from the contact pyramid of the relays A to D of the stock-tens storage device ST. This conductor group is shown in Fig. 13 and is labeled ST. Since the digit 5 has been stored on the storage group ST, Fig. 12, by the energization of relay A, it is the fifth conductor of the group which is grounded. Ground potential is accordingly extended over the fifth conductor of the group ST, contacts of relay 1301, and through the jumper 1341, to the left-hand contact of the contact set 1321. This energizes stock relay 1641 over conductor 1331, but only slightly, owing to the fact that the upper winding thereof is an inefficient winding drawing small current. As a result, only the contacts marked "x" are closed by the energization of the upper winding. In a stock-quotation receiving board containing many stocks, it is possible that every conductor closed through by a stock-hundreds relay such as the relay 1301 will have a plurality of jumpers connected to it, each leading to the upper winding of a separate stock relay, such as the stock relay 1641. When this conductor is grounded, each of the relays to which a jumper is connected pulls up through its first step and closes its "x" contacts, but no relay closes its remaining contacts except under a condition to be described hereinafter.

Relay C is operated in the stock-units group ST, Fig. 12, in accordance with the code digit 2, and arranges the contact pyramid so that ground from conductor 1433 is extended to the second conductor in group SU, Fig. 13. When this conductor is grounded, a connection extends through the jumper 1342 on the cross-connecting rack CCR to the right-hand terminal of the set 1321, and from thence to the lower winding of the stock register relay 1641, by way of conductor 1332 and the "x" contacts of the relay. Relay 1641, it will be recalled, is able to operate only far enough to close the contacts marked "x" when energized through the upper winding alone. At this time, however, the relay operates fully because the lower winding is an efficient winding. Accordingly, circuits are prepared by relay 1641 for operating the associated registers of stock BBA, code 152.

Selecting the stock range

According to the previous assumption and description, the instant price quotation is to be indicated on the receiving board as merely the last price. It will be recalled that the operator pressed the stock-range key LA, Fig. 5, and that this resulted in the transmission of the range digit 1, which is now stored on the storage group SR, Fig. 12, wherein the relay B is operated. With relay B in group SR operated, the ground potential on conductor 1434 is extended to the #1 conductor at the base of the SR group contact pyramid. This conductor group, as indicated by line 1207, extends to the stock-range relays of Fig. 16. With conductor 1 of this group grounded, a circuit is closed for stock-range relay 1655 (LA). Relay 1655 prepares restoring and operating circuit for the registers in the bottom row (LA) only of the stocks BBA.

Restoring the stock registers

In order that the resetting impulses transmitted to the stock registers shall set the registers in the desired positions, it is necessary to first send impulses to restore the registers from their instant positions to blank positions, used also as a normal or starting position. In order that the series of restoring impulses will advance to a stock register only as far as its blank position, each of the stock registers, the stock register R1, for example, Figs. 16, 17, and 18, is provided with a cam spring, such as 1708, which is in engagement with a permanently grounded spring only as long as the indicator is in any position other than the blank position. As will be seen in Fig. 17, the register R1, the upper left-hand register of the stock group BBA, Fig. 16, is provided with a cam 1706, arranged to rotate with the indicating drum 1704. This cam 1706 carries a projection 1709 which engages the end of the cam spring 1708 when the drum 1704, Figs. 17 and 18, is standing with its blank position exposed through the window in the front piece 1707. When thus operated by the projection 1709, the spring 1708 is moved out of engagement with the grounded spring and is moved into engagement with the spring connected to conductor 1732, Figs. 17 and 16. In this way, the local operating magnet 1702 is connected to ground in all positions of the register R1 except the blank position, in which position it is connected to the actuating-ground conductor 1632. The same is true of all the other registers, and it is indicated in Fig. 16 by showing a cam such as cam 1708 connected in the circuit of each operating magnet such as 1702.

The local sender of Fig. 15 is arranged to send impulses to restore and reset the stock registers, and this sender is controlled in its counting operation by the interrupter 1417, while the actual sending of impulses to the stock registers is accomplished by the interrupter 1531. These two interrupters are preferably operated by the same motor and in exact synchronism with one another, although at high sending speeds it may be advantageous to operate one interrupter (1417) slightly in advance of the other to compensate for the slight delay caused by the time required for the counting relays of Fig. 15 to respond.

Since the local sender is arranged to restore to blank position only the registers which are to be subsequently reoperated in accordance with the newly-received price quotation, the local sender cannot be started to restore stock registers until the stock and range digits have been received as hereinbefore pointed out, and the local sender must not be started to operate until the number of price digits to be received has been determined. As will be explained hereinafter, the transmitter is arranged to send any number of price digits from 1 to 4. As soon as the group of digit impulses constituting the price indication is started, relay 1413 operates and locks itself through the winding of relay 1414 to locking conductor 1446, as has been explained hereinbefore. In addition, at its lower armature, relay 1413 places ground potential on conductor 1448, closing a circuit through the contacts of relay 1101 of the register SH—PH for price-range relay 1114. Relay 1114 operates and locks itself to the grounded locking conductor 1435, conductor 1435 being grounded by ways of contacts of relay 1522, conductor 1435′ and contacts of the special-release relay 1650. In addition, since impulses are delivered to the remaining registers, ST—PT, SU—PU, and SR—PF, Fig. 11, a circuit similar to that described above for relay 1114 is closed for the remaining price-range relays 1115, 1116, and 1117. Each of these additional relays operates and locks itself to the said grounded locking conductor 1435. At its lower contacts, each of the relays 1114—1117 closes the impulse circuit from the grounded interrupter 1417 through to the counting relay impulse conductor 1552 of Fig. 15, by connecting conductors 1427 and 1442 together. The impulses, after passing from conductor 1427 through the contacts of the said relays and over conductor 1442, pass through contacts of relay 1524, the resting contact and armature 1539, and through the normally-closed contacts controlled by the lower armature of relay 1519 to the said impulsing conductor 1552. As soon as the interrupter 1417 closes, following the extension of the interrupter circuit to conductor 1552, a circuit is closed by interrupter 1417, over impulse conductor 1552, and through the contacts of relay 1502 of the synchronizing pair for relay 1501. Relay 1501 operates and locks itself at its lower armature to conductor 1551, grounded through the resting contact and armature 1526, contacts of relay 1524, conductor 1532, and the lower contacts of the special release relay 1650. Now, as soon as the interrupter 1417 opens, the short circuit is removed from around relay 1502, and relay 1502 energizes over conductor 1551 and in series with relay 1501. At its upper armature, relay 1502 transfers the impulse conductor 1532 to the first counting pair, comprising relays 1503 and 1504, and at its lower armature it closes the impulsing circuit between interrupter 1531 and the magnets in the bottom row (LA) of the group of registers assigned to stock BBA, Fig. 16. This happens at a time when the interrupters 1417 and 1531 are both in open position.

Now, each time interrupter 1531 closes following the above operation of relay 1502, it sends an impulse to the four magnets in the bottom row of the stock group of Fig. 16 over the following circuit; from battery by way of interrupter 1531, lower contacts of relay 1502, conductor 1553, middle armatures of the price-range relays 1114—1117, conductors 1428—1431, contacts of the operated stock-range relay 1655 (LA), contacts of the operated stock relay 1641, individual to the stock group BBA, the four magnets of the bottom row of stock registers in the group BBA, and thence to ground through the lower contacts of the associated cam springs, corresponding to the cam spring 1708 and the right-hand contact thereof, Fig. 17. Ten impulses are delivered to the magnets in the bottom row of the selected-stock group, which number is sufficient to secure the advance of any stock register the maximum distance to its blank position. It will be understood that conductor 1632 has no so-called actuating ground potential thereon at this time and that the four registers now being operated stop in their respective blank positions responsive to the cam springs thereof (corresponding to cam spring 1708, Fig. 7) being shifted to alternate position into engagement with the ungrounded conductor 1632.

The counting of the ten restoration impulses is accomplished by ten pairs of relays of the local sender, 1503—1522. These relay pairs are operated in regular sequence by the interrupter 1417 and over conductor 1532. The counting operation proceeds in regular manner, one pair of counting relays being operated for each impulse delivered by cam 1417, until relay 1519 operates at the beginning of the ninth counted impulse. Upon operating, relay 1519 closes at its lower contacts a new circuit for itself from conductor 1444, over which the impulses are being received, through the resting contact and armature 1529, and the inner armature and resting contact of relay 1520. Relay 1519 also locks itself to conductor 1442 at its inner armature, through the resting contact and inner-lower armature of relay 1522. At armature 1526, relay 1519 opens the locking circuit of relays 1501—1518, allowing all these relays to deenergize. A new path for the impulses being delivered by cam 1531 to the magnets of the stock registers is closed at armature 1527 through armature 1528, instead of through the lower armature and contacts of relay 1502, so that the circuit over which the restoring impulses are being delivered by way of conductor 1553 is not broken. The connection formerly existing between conductor 1442 (over which impulses are being received from cam 1417) and the regular impulse conductor 1552 of the counting relays is opened at the normally-closed contacts controlled by the lower armature of relay 1519, thereby preventing premature reoperation of relay 1501.

When the initial circuit of relay 1519 is broken at cam 1417 at the end of the ninth restoration impulse, relay 1520 operates in series with relay 1519 and transfers the operating circuit to relay 1521. Relay 1521 operates at the beginning of the tenth restoration impulse and closes a locking circuit for itself at its lower armature through the winding of relay 1522 and through contacts of relay 1524 to conductor 1550. When the initial circuit of relay 1521 is opened at the end of the tenth restoration impulse, relay 1522 energizes in series with relay 1521, and at its inner-lower armature opens the locking circuit of relays 1519 and 1520, while at armature 1528 it disconnects the interrupter 1531 from conductor 1553. Relays 1519 and 1520 now fall back, and relay 1519, at armature 1526, replaces ground potential on locking conductor 1551 from conductor 1352 through contacts of relay 1524.

The restoration impulses have now been delivered to the registers of stock group BBA in range LA, and all of these stock registers are standing in blank position in readiness to be operated by the local sender of Fig. 15 in accordance with the instant set position of the storage devices PH, PT, PU, and PF. Accordingly, the price-range relays 1114—1117, which were operated at the beginning of the receipt of the group of price digits in order to determine the number of registers in the range group LA of the selected stock to be restored, have served their purpose and may be released to permit the control of the respective values of the resetting digits transmitted by the local sender to be exercised in accordance with the setting of the storage groups PH, PT, PU, and PF of Fig. 12. Accordingly, when relay 1522 pulls up at the termination of the tenth restoration impulse, it removes ground at its upper armature from locking conductor 1435 to permit relays 1114—1117 to fall back.

Resetting the stock registers

It will be recalled that relay 1416 is operated over conductor 1214 as soon as the price digits are transferred to the storage devices PH—PF of Fig. 12. With relay 1416 operated, and with relay 1522 of the local sender operated at the end of the restoring operation, a connection exists between conductor 1442, over which impulses are received from cam 1417, and conductor 1552, through which the impulses are delivered to the counting relays, the connection being as follows: from conductor 1442 through contacts of relay 1524, conductor 1443, contacts of relay 1416, conductor 1444, and armature 1530 and its working contact to conductor 1552. When this connection is completed, either at the contacts of relay 1416 or at the contacts of relay 1522, whichever close last, the synchronizing pair comprising relays 1501 and 1502 are rendered operative again to respond to the first impulse received from cam 1417 and connect interrupter 1531 to conductor 1553 at the lower contacts of relay 1502 when the first impulse subsides. It will be noted that conductor 1553 extends to and connects with the apex of each of the pyramids of contacts in the storage groups PH, PT, PU, and PF. In the group PH, the digit 1 is recorded by the energization of relay B as hereinbefore pointed out, with the result that conductor 1553 is connected through contacts of the operated relay B, and through contacts of the unoperated relays A, C, and D to the number 1 associated conductor, which is connected by means of the cable 1208, and through contacts of relay 1504 to the hundreds operating conductor 1428; in the storage device PT, the digit 0 is recorded by the energization of relays B and D with the result that conductor 1553 is connected through contacts of the unoperated relay A, contacts of the operated relay B, contacts of the unoperated relay C, and contacts of the operated relay D to the number 0 conductor, and thence by way of a conductor in the cable 1209, and contacts of relay 1524, to the tens operating conductor 1429; relays C and D are operated in the storage device PU, with the result that conductor 1553 is connected through contacts of the unoperated relays A and B and through contacts of the operated relays C and D, to the number 4 conductor, and thence by way of a conductor in the cable 1210, and through contacts of relay 1510, to the units operating conductor 1430; and the relay B is operated in the price-fractions group PF, with the result that conductor 1553 is connected through the associated-contact pyramid to the number 1 conductor thereof, and thence by way of a conductor in the cable 1211, and through contacts of relay 1504 to the fractions operating conductor 1431.

Accordingly, with the synchronizing relay 1502 operated, the next impulse of current delivered by the cam 1417 operates relay 1503 over conductor 1552, and, at the same time, an impulse is delivered by the cam 1531 over conductor 1553, resulting in a current flow through the contact pyramids of the register PH—PF, and through contacts of certain of the counting relays of the local sender, as above pointed out, and over each of the conductors 1428—1431 to the magnets of the registers in the range row LA of Fig. 16. At this time, conductor 1632 serves as a ground return conductor in common for the four registers, being connected through contacts of the operated stock relay 1641 to ground by way of conductor 1535 and the lower contacts of the operated relay 1522. At the end of the first resetting impulse, relay 1504 operates in series with relay 1503, when its circuit is opened by the cam 1417, and disconnects conductors 1428—1431 from the number 1 conductors of the contact pyramids of the price-digit storage devices of Fig. 12. This breaks the connection between conductors 1553 and conductors 1428 and 1431 because the hundreds and fractions digit now stored are both 1. Accordingly, the hundreds and fractions registers in the range group LA, Fig. 16 are left standing with the digit 1 exposed.

The next three impulses are delivered over conductors 1429 and 1430, advancing the tens and units registers to the fourth position. In the meantime, relays 1505—1509 have operated, and relay 1510 operates at the end of the fourth resetting impulse, disconnecting conductors 1428—1431 from the number 4 digit conductors. Since the digit 4 is set up on the price-units storage group PU, the connection between conductor 1553 and the units conductor 1430 is broken when relay 1510 pulls up, leaving the units register in the range group LA standing with the digit 4 exposed.

As the resetting operation progresses, further impulses are delivered over conductor 1429 to the tens register, and the counting relays continue to operate one after the other without opening the circuit until relay 1520 has operated at the end of the ninth resetting impulse.

At the beginning of the tenth resetting impulse, a circuit is completed through the even-numbered counting relays 1502—1522 and through contacts of relay 1524 for relay 1523. Relay 1523 operates and locks itself at its lower armature to conductor 1447, now grounded at the lower contacts of relay 1416. Accordingly, relay 1524 operates in series with relay 1523 at the end of the tenth restoring impulse, and disconnects the number 0 digit conductors from the register-operating conductors 1427—1431, thus terminating the transmission of the resetting impulses. The hundreds, tens, units, and fractions registers of the range group LA, Fig. 16 are now in position to display the digits 1, 0, 4, and 1, respectively.

Clearing out the receiver

When relay 1524 operates, it opens the locking circuits of relays 1501—1522 at its inner-lower armature, and at its lower armature it opens the impulsing circuit of the counting relays so as to prevent them from starting to reoperate again. Relay 1524 also disconnects ground potential from conductor 1441, deenergizing relays 1415 and 1416, and permitting all of the locked-up storage relays of Fig. 12 to fall back because the ground potential is removed from locking conductors 1213 and 1214. Relay 1416 removes ground potential from conductor 1447, permitting relays 1523 and 1524 to fall back. Relay 1415 removes ground potential from conductor 1434 and replaces ground potential on conductor 1433, whereupon relays 1201' and 1202' fall back, and relays 1201 and 1202 energize preparatory to handling the next quotation.

The operated hundreds relay 1301 of Fig. 13, together with the operated stock relay 1641, and the operated range relay 1655 fall back responsive to the deenergization of the storage relays of Fig. 12. Since the input-control relays 1409—1413 of the device IC fell back responsive to the opening of their locking circuit upon the energization of relay 1416, and since relays 1114—1117 fell back as explained hereinbefore, upon the opening of their locking circuit over conductor 1435, upon the energization of relay 1522 at the end of the restoration operation, all of the relays operated during the handling of the quotation have now been restored, and the apparatus is in the normal condition shown in the drawings with only relays 1201 and 1202 energized.

*Transmitter starts before receiver clears out*

It will be recalled that when relay 1416 operates at the end of the receipt of the price digits, it removes ground potential from conductor 1446, deenergizing relays 1409—1414. It will be recalled also that relay 1416 locks itself to conductor 1441 and maintains the ground potential disconnected from conductor 1446 until the local sender has finished sending the restoration and the resetting impulses. If the first group of digits for the next quotation starts to come in before relay 1416 has been deenergized to replace ground potential on conductor 1446, the grounding of conductor 1445 closes a circuit for relay 1409 as before, and a branch circuit is closed through contacts of the operated relay 1416 for relay 1417. Relay 1417 operates and shunts the contacts of relay 1416 which removes the ground potential from conductor 1446, thereby replacing ground potential on this conductor.

It will be noted that the wipe-out relay 1119, upon being operated to cause all registers in a selected stock to be restored to blank position, removes ground potential from conductor 1446 to permit relays 1409—1414 to restore, and that at armature 1122 it connects up relay 1417 so that this relay will operate to replace the ground potential on conductor 1446 in case the next group of digits start to come in while the ground potential is removed therefrom.

*Receiving short numbers*

In some cases a new stock quotation differs from the previous one only in that the new stock quotation ends with a different fraction, in which case it is sufficient to reset the fraction stock register in the selected range, leaving the hundreds, tens, and units stock registers standing as they were. In other cases the new quotation may require a resetting of only the unit and fractions stock registers, while in still other cases a change is required in the tens, units, and fractions registers, while the hundreds register does not need to be reset. As will be explained hereinafter, arrangements are made in the transmitter so that the operator may set up only the price digits which differ from the corresponding digits of the previous quotation, and the transmitter transmits only the price digits set up.

In case no impulses are received to set the register SH—PH of Fig. 11 in accordance with a price-hundreds digit, none of the relays are reoperated and therefore no transfer to the storage group PH of Fig. 12 takes place. Since none of the relays A to D of the group PH are energized, none of the conductors 1 to 0 extending from the base of the associated contact-pyramid are connected up, and no resetting impulses are sent to the hundreds register in the selected stock and stock range. Also, since none of the relays in the register SH—PH of Fig. 11 are operated, the corresponding price-range relay 1114 is not operated at the time the restoration impulses are transmitted, and no connection exists between conductor 1553 and the hundreds conductor 1428, with the result that the hundreds register is not restored. In a similar way, if no impulses are transmitted corresponding to the price-tens digit price-range relay 1115 is not operated, and no transfer to the storage group PT takes place, and the price-tens register remains in its previous position. In the same way, if no units digit is received, price-range relay 1116 is not operated and the units register remains in its previous position. Also, in case the operator neglects to set up a fractions digit, the fractions price-range relay 1117 is not operated and the fractions operating conductor 1431 is not connected up; and the fractions register remains set in its previous position.

*Setting up short numbers*

In the transmitter, variations in the number of digits in a transmitted price is automatically taken care of in a manner now to be explained. In case only a single price digit is set up by the operation of only one of the digit keys of Fig. 5, this digit is registered on the price-hundreds register PH, Fig. 7. In case the operator next operates a stock-range key and causes the operation of one of the relays A to D of the stock-range register SR, Fig. 6, a circuit is closed over conductor 609 at the inner-lower armature of transfer relay 610, through the lower armature, normal, or relay 707, lower armature, normal, of relay 705, and the lower armature, normal, of relay 703, for connecting relay 707. In this case, relay 707 connects the conductors extending from the upper contacts of the relays A to D of the register PH to the conductor group PF extending to the sending apparatus in Figs. 8 and 9. Accordingly, the digit registered on the register PH is transmitted as a fractions digit, and no hundreds, tens, and units digits are transmitted. When a fractions digit only is recorded, the transfer relays 703, 705, and 707 of the registers PT, PU, and PF, respectively, are not operated. Accordingly, ground potential remains on conductors 761—763 of the price-range group, being removed from conductor 764 only. Upon the operation of connection relay 436, preparatory to the starting of the sending operation, conductors 761—764 are connected through to the price-range group PR, but the connection is not completed to the sending apparatus of Figs. 8 and 9 until counting relay 802 of the pair comprising relays 802 and 803 is pulled up in series with relay 803, as hereinbefore described, just prior to the transmission of the group of price digits. When this occurs, the conductors of the price-range group are connected through to the stop relays 808, 812, 909, and 913. Since conductors H, T, and U in the price-range group are at this time extensions of the grounded conductors 761, 762, and 763, relays 808, 812, and 909 are operated immediately, and the transmission of price-hundreds, price-tens, and price-units impulses is thereby prevented.

Assuming that the operator sets up only two digits, a units digit and a fractions digit, the units digit is recorded on the register PH of Fig. 7, and the fractions digit is recorded on the register PT. Under this condition, transfer relays 701 and 703 are operated, and, when connecting conductor 609 becomes grounded, a circuit is closed through contacts of the operated transfer relay 703 for connecting-relay 708. Relay 708 makes a connection between the contacts of the register PH and the price-units conductor-group PU, and it also makes the connection between the contacts of the register PT and price-fractions conductor-group PF. Accordingly, the digits registered are sent out as the units and fractions digits, and the transmission of the hundreds and tens digits is prevented because conductors 761 and 762 remain grounded, operating relays 808 and 812 before the price-digits group is transmitted.

In case three digits are set up on the registers PH, PT, and PU, these digits are the tens, units and fractions digits because connecting relay 709 is operated through contacts of the operated transfer relay 705. At this time, conductor 761 alone of the price-range group remains grounded through the contacts of the unoperated transfer relay 708, preventing the transmission of price-hundreds impulses by the cam 855.

*Setting up yesterday's closing price*

At the close of the day, the last stock quotation for each stock is resent as yesterday's closing price so that it will show on the indicators when business is resumed the next day. To do this, the operator sets up the stock indication in the manner hereinbefore described. Having set up the stock indication, the operator depresses the stock-range key WO (wipe-out), Fig. 5. When the wipe-out key WO is operated, relay B of the stock-range register SR, Fig. 6, operates to record the digit 9. Transfer relay 610 operates when the key is released, and starts the translation of the stock letters into the stock code in the manner hereinbefore described by placing ground at its upper contacts on conductor 601 through the upper contacts of the start relay 612. As soon as the translation has been completed, as evidenced by the operation of relays 406, 407, and 408, a circuit is closed through the contacts of the latter relays and through contacts of relay 610 for start relay 612. The sending apparatus of Figs. 8 and 9 is started to operate in the manner hereinbefore described. and the stock-code digits and stock-range digit 9 are transmitted while the counting switches CS1 and CS2 are moving over the first half of their bank contacts. Since no price digits have been set up on the price registers of Fig. 7, all of the price-range conductors 761—764 are grounded through the contacts of the unoperated relays 701, 703, 705. and 707, resulting in the reoperation of all of the stop relays 808, 812, 909, and 913 of Figs. 8 and 9 through contacts of relay 802 before the starting of the transmission of the price-digit group. Accordingly, all of the sending cams 825, 826, 827, and 828 are disconnected before any price-digit impulses have been transmitted, and the sending apparatus is restored to normal as soon as it has advanced two steps to bring about the energization of relays 806 and 807 to again complete the circuit of relay 805.

In the receiver of Figs. 11–16, the stock-code digits and the stock-range digits are received on the registers of Fig. 11 in the manner hereinbefore pointed out, and at the end of the stock-digit transmission the received digits are transferred to the upper row of storage devices of Fig. 12. The received stock-range digit is represented in the receiver code of Fig. 9 by the code BC. Accordingly, relays B and C in the stock-range storage device SR are operated over the conductor group 1134 from the register SR—PF. With relays B and C operated, ground potential is placed on the ninth conductor extending from the base of the associated contact-pyramid, closing a circuit for the wipe-out range relay 1654 of Fig. 16. Relay 1654 operates and closes a circuit for each of the five regular range relays 1655—1659. Accordingly, circuits are prepared for operating all registers in all range groups of the selected stock. In addition, the special wipe-out range relay 1119 is operated over conductor 1212 in parallel with relay 1654. Relay 1119 connects the register impulse conductor 1553 to the hundreds, tens, and units conductors 1428, 1429, 1430, and 1431, so that the restoring group of impulses now to be transmitted is sent out over all four of the conductors 1428—1431. Relay 1119, in addition, starts the hereinbefore-described restoring operation of the local sender of Fig. 15 by connecting conductors 1427 and 1442 together at armature 1120. Accordingly, following the operation of the synchronizing pair comprising relays 1501 and 1502 over the relay-operating conductor 1552, and the consequent connecting-up of impulse conductor 1553 to the cam 1531, ten impulses are sent to all of the registers of the selected stock, advancing all registers to blank position. As hereinbefore described, each register stops as it reaches blank position owing to the fact that the associated cam spring switches the magnet circuit over the actuating ground conductor 1632. In addition, the wipe-out relay 1654 at its inner-lower armature prepares a short-cut operating circuit for the 0' relays 1523 and 1524, so that when the operating impulse is delivered to relay 1521, during the transmission of the tenth restoration impulse, a multiple circuit is closed through the inner-lower contacts of relay 1654 and through contacts of relay 1524 for relay 1523. Relay 1523 operates at the same time that relay 1521 does, and the locking circuit for relay 1523 is closed through relay 1524 to conductor 1447, now grounded at the lower contacts of relay 1654. When the tenth restoration impulse subsides, relays 1522 and 1524 energize in series with relays 1521 and 1523. Relay 1522 opens the connection between the registers and cam 1531 at armature 1528, relays 1501—1518 having been previously restored by the operation of relay 1519. Relay 1524 opens the counting-relay operating circuit at its lower armature. At its inner-lower armature, relay 1524 opens the locking circuits of relays 1521 and 1522, causing these relays to release, and at its upper armature, relay 1524 disconnects ground potential from conductor 1441, bringing about a release of the relay 1415 and a consequent deenergization of the operated register relays of Fig. 12. Relays 1119 and 1654 fall back when the stock-range register relays release, and relay 1654 opens the locking circuits of relays 1523 and 1524 at its lower armature, permitting these relays to fall back.

As a result of the foregoing operation, all of the registers associated with the stock in question have now been restored to blank position.

In order to cause the last price of today to be set up as yesterday's closing price, for use on the following day, the operator sets up the stock letters as before, followed by the last-price digits; and she also operates the stock-range key YC, causing the stock-range digit 8 to be set up by the energization of relay A of the stock-range register SR, Fig. 6. The sending apparatus of Figs. 8 and 9 is started to operate as before, sending the stock digits and price digits to the several receivers. In the receiver of Figs. 11–16, the receipt of the stock-range digit 8 on the stock-range storage device SR of Fig. 12 results in ground potential being placed on the eighth digit conductor associated therewith, operating relay 1659, which is the yesterday's close range relay. When this relay operates, the conductors 1428—1431 are connected to the registers in range YC (the upper row) of the selected stock. The price digits are accordingly transmitted to the relays in the upper row, setting up yesterday's closing price.

*First quotation of day*

When the first price for a particular stock is sent through, this price is to be recorded as the opening price, as the high price, as the low price, and as the last price. Accordingly, the registers in the ranges OP, HI, LO, and LA (all range rows except the top row) are to be operated in unison. Accordingly, after setting up the stock letters and the opening-price digits, the operator depresses the range key UN of Fig. 5, causing the stock-range digit 7 to be set up on the register SR, Fig. 6, wherein relays C and D are thus operated.

In the receiving apparatus of Figs. 11–15, the receipt of the stock-range digit 7 results in the operation of relays A and C of the storage group SR, Fig. 12, in accordance with the receiver code of Fig. 20. With relays A and C operated, a connection is completed over conductor 7 of the associated group for the unison range relay 1653, Fig. 16. When this relay operates, it closes circuits for the relays 1555—1558, which are the last, low, high, and open range relays. It will thus be seen that the received price digits are set up on the desired rows of registers.

*Releasing partially-operated receivers*

Since it may happen occasionally that a receiver fails to finish its operation and clear out as hereinbefore described, to get out of step with the transmitter, arrangements have been provided for sending a special range digit, the range digit 0, to the receivers at intervals in order to release any partially-operated receivers.

In order to perform the special-releasing operation, the operator sets up the letter or letters assigned to any desired stock, after which she depresses the range key RL, actuating the C relay of the stock-range register SR, Fig. 6, to set up the range digit 0. The stock-code digits assigned to the registered stock-letter combination, together with the stock-range digit 0, are transmitted by the sending apparatus of Figs. 8 and 9, but no price digits are transmitted because none are set up. While the stock digits thus set up are being sent out, the operator sets up the same combination again, with the result that the transmitter is operated again under the control of the other register set to repeat the stock-code digits and the stock-range digit 0.

In the receiver of Figs. 11–16, the first group of digits comprising stock-code digits and the stock-range digit 0 is received on the registering apparatus of Fig. 11 in the usual manner in case the receiver is in the condition shown in the drawings before the transmission is started. In this case, the setting up of the stock-code digits causes a stock to be selected and a stock relay such as 1651 to be operated in the manner hereinbefore described, and the setting up of the range digit 0 on the storage group SR of Fig. 12 results in the operation of relays B and D therein in accordance with the receiver code, Fig. 20. With relays B and D operated, a circuit is closed through the conductor O of the associated group for the special-release relay 1650. When relay 1650 operates, it locks itself at its inner-upper armature through contacts of the slow-to-operate relay 1649, and at its remaining upper armatures, it disconnects ground potential from all of the locking conductors 1435', 1436, 1437, 1438, and 1441'. This releases all of the locked-up apparatus in the receiver with the exception of relay 1650. At its lower armature, relay 1650 closes a circuit for relay 1649, and relay 1649 operates after a very slight interval and opens the locking circuit of relay 1650. Relay 1650 thereupon deenergizes and opens the circuit of relay 1649, and relay 1649 falls back also. In this case, the second group of stock-code digits and the stock-range digit 0 are received and disposed of in the manner just described.

It is to be noted that in case the stock-group of digits fails to transfer to the upper row of registers of Fig. 12 for any reason, such, for example, as an improperly-soldered connection, or a dirty or oxidized contact, relay 1415 fails to operate and the upper row of storage devices of Fig. 12 remains connected up. Accordingly, the next group of digits received is added to the group of digits previously received on the registers of Fig. 11, with the result that a transfer is, in all probability, made at the end of the next group of digits. Under this condition, however, the price digits are super-imposed on the stock digits and the combination is transferred to the stock-digit storage devices of Fig. 12, in the upper row. The receiver is now in the same condition as it is in ordinarily at the end of the stock group of digits, and the price-digit storage devices are connected up upon this operation of relay 1415. Accordingly, the stock digits in the following quotation are received and transferred as price digits, and the receiver is out of step with the transmitter.

Assuming now that the receiver of Figs. 11–16 is out of step with the transmitter at the time the first series of digits containing the range digit 0 is received, this series of digits is transferred to the lower row of storage devices of Fig. 12 instead of the upper row, and the local sender is started to perform its restoring operation. As soon as the restoring operation has been completed, the resetting impulses are sent in accordance with the setting of the lower group of storage devices of Fig. 12. As soon as the resetting impulses have all been sent, relay 1524 operates as hereinbefore described and removes ground potential at its upper armature from conductor 1441, releasing relays 1415 and 1416, placing the receiver in step with the transmitter.

With the receiver now in step with the transmitter, the next group of stock digits and the stock-range digit 0 is handled in the manner hereinbefore described, including the operation of the special-release relay 1650.

Absorbing transmitted restoration impulses

The receiver of Figs. 11-16 has been arranged so that it may be used in connection with a transmitter which transmits a group of restoring digits between the group of stock digits and the group of price digits. Systems have been used wherein the transmitter, following the transmission of the stock digits, transmits the digit 0 on each channel over which it is to transmit a price digit. The digit 0 on these channels is utilized in previous receivers and repeated directly to the registers in the selected stock and stock range to restore them to blank position. A transmitter having this characteristic is disclosed in the patent to R. Steeneck, 1,945,470, granted January 30, 1934. When the receiver of Figs. 11 to 16 is operating in conjunction with such a transmitter, it is merely necessary to cut the jumper 1447, thereby preventing relays 1411 and 1412 from operating over conductor 1445 at the time relays 1409 and 1410 are operated. Under this condition, when relay 1410 operates it releases connecting relay 1417, disconnecting the receiving circuit from conductors 1421—1424. Then, when the restoring impulses are received, the only effect is to operate one or more of the relays 1405—1408 to place and maintain ground potential on conductor 1445 as long as the restoration group of impulses is being received. When conductor 1445 is thus grounded, a circuit is closed through the inner armature, operated, of relay 1410 and through contacts of relay 1412 by relay 1411. Relay 1411 operates and locks itself to conductor 1446 in series with relay 1412. As a result, relay 1412 operates when conductor 1445 is ungrounded at the end of the series, extending the conductor 1445 through to relays 1413 and 1414. At its upper armature, relay 1412 energizes connecting relay 1417 again.

Curtailed operation of the local sender

Relay 1525 has been added to the local sender in order to curtail the operation and thereby shorten the operating time of the sender whenever it is possible to do so. Whenever a group of restoring impulses is being transmitted by the local sender, and one of the registers to be restored must be restored from the digit 1 position, ten impulses are required, but if no register is standing in position 1, a lesser number of restoring impulses suffices to restore all of the registers to blank position. For example, all registers to be restored may be standing in position 9 or position 0, in which case only 1 or 2 restoring impulses will suffice. Accordingly, relay 1525 is arranged to test the condition of the impulse circuit, and to curtail the restoring operation whenever possible.

As soon as the synchronizing relay 1502 has pulled up, the register-operating conductor 1553 is extended through contacts of a part or all of the price-range relays 1114—1117, and a part or all of the conductors 1428—1431, to ground through a part or all of the registers in the selected stock and range. With relay 1525 shunted across the interrupting cam 1531 and the brush thereof, relay 1525 is in series with one or more of the registers being operated until they have all been restored to blank position. Relay 1525 pulls up before the first restoring impulse is sent to the registers, and at its two armatures it opens the two circuits controlled thereby. When the first impulse is sent to the registers, relay 1525 is shunted by the cam 1531, but the relay is adjusted so that it remains operated by virtue of the self-induced circulating current flowing through its winding at this time. When the first impulse is transmitted, relay 1503 operates as before described, and at its lower armature it connects up the two armatures of the now-operated relay 1525.

At the end of the first impulse, relay 1525 is again included in series with the register or registers being operated, and it again energizes fully in series with them. It may be well to mention at this time that the resistance of relay 1525 is sufficiently high to avoid interference with the operation of the registers. In case one impulse is sufficient to drive all of the selected registers to blank position, relay 1525 falls back as soon as the cam 1531 moves into open position, following the first impulse, because the cam of the operated stock register has shifted the circuit thereof from the local ground connection to conductor 1535, now ungrounded. If this condition does not obtain at this time, it does at the end of one of the succeeding impulses. If relay 1525 falls back for the above-mentioned reason before nine impulses have been delivered, and consequently before relay 1518 has operated, the following impulse delivered to the counting relays over conductor 1442, in addition to passing through the regular counting chain over conductor 1552, passes from conductor 1552 through the lower contacts of relay 1503, contacts of the now-deenergized relay 1525, and contacts of relay 1520 to relay 1519. Upon operating, relay 1519 locks itself to conductor 1442 through armature 1530 and its resting contact as hereinbefore explained, and releases relays 1501—1518. The operation of relay 1519 is followed by the operation of relays 1520, 1521, and 1522 as explained hereinbefore.

Following the transmission of the restoration pulses, the resetting impulses are transmitted, the transmission being started subsequent to the re-operation of synchronizing relays 1501 and 1502. The contacts of relay 1525 are again connected up at the lower armature of relay 1503 at the beginning of the first impulse transmitted to the registers. As before, however, relay 1525 operates in parallel with the open interrupter 1531 before the first impulse is transmitted, and opens both of its sets of contacts. Relay 1525 remains operated as long as impulses are being delivered to the registers, but, as soon as the last impulse circuit has been opened at the contacts of the relays, such as 1504, 1506, etc., relay 1525 falls back. With relay 1525 deenergized, and with relay 1503 energized, the next application of ground potential to impulse conductor 1552 results in a circuit being closed through the contacts of relay 1503, lower contacts of relay 1525, and the upper contacts of the energized relay 1521 to relay 1523. Incidentally, the circuit previously described for relay 1520 is closed at the same time through the inner contacts of relay 1525 so that relay 1519 operates in parallel with relay 1523. Relay 1523 locks itself to conductor 1447 through the winding of relay 1524, with the result that relay 1524 operates as soon as ground potential is removed from conductor 1553 by the cam 1417, causing the local sender to be immediately cleared out in the manner hereinbefore described.

Correcting an operator's error

In order to assist the operators and attending supervisors, a receiving board operated from one of the regular receiving circuits of Fig. 10 is provided within view of the operators, and, in case an operator makes an error in setting up a quotation, the error is very likely discovered at once by the operator or perhaps by a supervisor. In this case, the operator making the error corrects it by sending through the correct quotation instead of the quotation in error. In case the operator discovers her error, however, before the setting up of the quotation has been completed, the operator may release the operated register relays by momentarily operating the error key ER, Fig. 1. When the key ER is operated, ground potential is placed on conductor 101, operating relay 209. Relay 209, at its upper armature, removes ground potential from locking conductor 250, releasing any operated relays in the stock registers SR1, SR2, and SR3. Relay 209 also disconnects ground at its lower armature from locking conductor 101. Conductor 101 is connected through contacts of whichever of the relays 615 and 614 is unoperated to locking conductor 606 or 606', and the removal of ground potential from conductor 101 consequently releases any of the price registers of Fig. 7 that happens to be operated.

When the error key is restored, relay 209 falls back and replaces ground potential on the locking conductors 250 and 101, enabling the operator to proceed to set up the correct quotation.

Failure of sending apparatus to start

Since the operation of the sender-start relay 612 in register set No. 1, and the operation of the similar relay in register set No. 2 to start the sender and to transfer the control exercised by the keys to the other register set, is dependent upon the completion of the translation of the stock letters into the stock code as hereinbefore pointed out, the sender fails to start if the operator sets up an unassigned stock-letter combination, as in this case no stock relay is operated, and no translation takes place. Assuming that the operator does not realize that she has erred in setting up an unassigned stock-letter combination, she proceeds with the setting up of the next quotation by operating her keys in the usual manner. If the stock quotation set up in error includes a single-letter combination or a two-letter combination, it is quite likely that upon the next operation of a stock-letter key and the consequent energization of a relay in the connected stock register of Fig. 2 will result in a combination corresponding to an active stock being set up, in which case the translation is effective, and the correct price quotation is transmitted, as previously set up, but to the wrong group of stock registers. In this case, the operator or the supervisor discovers the mistake and the operator rectifies it by replacing the correct quotation on the registers of the stock group operated in error and by sending the misplaced quotation to the correct destination.

Assuming, however, that the sender fails to start upon the second actuation of the stock-letter keys, the operator proceeds to set up the remainder of the quotation and attempts to operate one of the stock-range keys of Fig. 5. The operator discovers that the stock-range keys are locked, transfer relay 610 having operated to ground the locking conductor 620. Ordinarily the operator has to wait only a short interval of time for the stock-range keys to become unlocked, but in this case the stock-range keys remain locked, thus notifying her that the transmitter has not started. In order to correct the error, the operator depresses the error key of Fig. 1 bringing about an operation of relay 209 to release the registers of Fig. 2, and to remove ground potential from conductor 101 to release the registers of Figs. 6 and 7. The price registers of the register set upon which the erroneous quotation was set up are released by the removal of ground potential from conductor 101, owing to the fact that the transfer has not been made to the alternate register set because the start relay has not operated.

After having released the operated registers, the operator again sets up the quotation which was erroneously set previously, and she proceeds from that point in sending out the quotations in regular order.

If the failure of the sender to start results from equipment trouble rather than an error of the operator, as pointed out above, and persists after the operator has depressed the error key and again set up the quotation previous to the one set up as far as the locked range keys, the operator switches from the transmitter T1 of Fig. 1 to 9 to the transmitter T2, Fig. 10, by operating the transfer key TK1 so as to disconnect the repeater R1 from conductors 851—854 and to connect it to the corresponding conductors of the transmitter T2. The operator now uses the transmitter T2, and sets up the quotations on the key set thereof. In the meantime, the transmitter T1 is entirely disconnected from the system so that it may be repaired while the quotations are being handled from the transmitter T2. Similarly, the operator using the transmitter T3 may transfer to the transmitter T4 by means of the transfer key TK2 whenever it becomes desirable to do so.

Handling preferred stock

In addition to the so-called common stock, there is often a so-called first-preferred stock on the market of the same letter designation as the common stock, and sometimes a second-preferred stock. For example, the stock BBA is a common stock and in addition there may be a stock BBA, first-preferred, and a stock BBA, second-preferred. In setting up a stock indication BBA, first-preferred, the operator sets up the BBA designation and operates the first-preferred key 1-PF, Fig. 1. When the first-preferred key 1-PF is operated, a circuit is closed over conductor 103 and through contacts of the energized relay 404, Fig. 4, for the first-preferred relay 401, assuming the register set #1 to be connected up. Relay 401 operates and locks itself to conductor 606 at its upper armature, and at its lower armatures shifts the conductors 1 to 5 of the group CD2 from in connection with the relays 1 to 5 of the stock-tens register ST into connection with the relays 6—0, respectively. Since the tens code digit ordinarily transmitted for stock BBA (code 152) is the digit 5, this digit is now transmitted as the digit 0, selecting a different stock-hundreds group in the receiver.

If, instead, the second-preferred key 2-PF is operated, conductor 102 is grounded instead of conductor 103 closing a circuit through contacts of relay 405 for the second-preferred relay 402. In this case the first-preferred relay 401 is not operated, and the tens code digit is sent out as the digit 5, but relay 402 makes a similar change as regards the conductor set CD3, with the result that the units digit instead of being the units digit 2 is sent out as the units digit 7.

What is claimed is:

1. In a digit-impulse receiver, a receiving relay responsive to a plurality of series of incoming impulses each representing a separate digit, a digit-registering device comprising counting relays for recording the number of operations of said receiving relay responsive to each series of impulses, a counting device for counting the number of impulse series received, a locking circuit for said registering device, and means controlled by said counting device for closing said locking circuit at the beginning of each series of impulses and for opening said locking circuit after each series of impulses has been terminated.

2. In a stock-quotation receiver, receiving apparatus responsive to a plurality of series of impulses corresponding to a stock quotation, an input-control device including means for counting the number of received series of impulses, a holding circuit for said input-control device, means effective when the counting device has counted a number of series of incoming impulses corresponding to a complete quotation for opening the holding circuit of said input-control device and for maintaining it open pending the disposition of the received quotation, means for disposing of the received quotation, and means effective in case another quotation starts to come in before the first quotation is disposed of for closing an alternative locking circuit for said input-control device.

3. In a digit-receiving and storing apparatus, a receiving device comprising a chain of counting relays for receiving successive digits, a storage device for storing the first digit received, means effective after a digit has been received on the receiving device for transferring said digit to the storage device, a locking circuit for holding the receiving device operated, means responsive to the operation of said storage device for opening the locking circuit of said receiving device to permit it to restore in preparation for the receipt of the next digit, and means responsive to the receipt of the next digit for again closing said locking circuit.

4. In a stock-quotation receiver, receiving apparatus for receiving a plurality of price digits during the same period of time, a group of price-range relays, and means effective upon the starting of the receipt of a group of price digits and responsive to the operation of the receiving apparatus for operating a number of said price-range relays indicative of the number of price digits being received, digit-posting means, and means controlled by said price-range relays depending upon the number of them operated for variably controlling said posting means.

5. In a stock-quotation receiver wherein a stock is represented by a plurality of price-digit indicators, receiving apparatus for receiving a plurality of price digits during the same period of time, a group of price-range relays, means effective upon the starting of the receipt of a group of price digits and responsive to the operation of the receiving apparatus for operating a number of said price-range relays indicative of the number of price digits being received, and means controlled by said price-range relays for restoring the ones of the price-digit indicators which correspond to new price digits being received.

6. In a stock-quotation receiver, a plurality of stock-register groups, a group of common actuating conductors, a separate stock relay for each stock-register group having contacts for connecting the common actuating conductors to the associated group of stock registers, a group of tens conductors, a group of units conductors, means including registering apparatus for rendering electrically effective one conductor in the tens group and for rendering electrically effective one conductor in the units group, each stock relay having a winding of low efficiency connected to one of said tens conductors, each relay being adjusted to operate only partially responsive to the energization of said winding, each of said relays having a winding of high efficiency associated with one of said units conductors but normally disconnected therefrom, and contacts on each relay arranged to close when the relay is only partially operated to connect the winding of high efficiency to the associated units conductor, each relay being arranged to operate fully when energized through its winding of high efficiency.

7. In a stock-quotation receiver, two groups of conductors, means including digit registering apparatus for rendering electrically effective a conductor in one group and for rendering electrically effective a conductor in the other group, a plurality of stock selecting relays, each relay having two windings, one winding of each relay being normally connected to a conductor in one of said groups and arranged so that it responds to the rendering electrically effective of the conductor with which the said one winding is connected by operating only partially, another winding on each of said stock-selecting relays associated with one of the conductors in the other of said groups, but normally disconnected therefrom, and contacts on each of said stock relays arranged to connect the said other winding of the relay to the associated other conductor when the stock selecting relay is only partially energized, each relay being arranged to operate fully when energized by both windings.

8. In a stock-quotation receiver, a plurality of groups of stock-register-connecting relays, a stock-hundreds relay for each group of stock-register-connecting relays, stock-tens conductors having multiple connections into each group of stock-register-connecting relays through contacts of said stock-hundreds relays, respectively, and stock-units conductors multipled directly to said stock-register-connecting relays independent of the contacts of the stock-hundreds relays, means for partially energizing one or more of said connecting relays over one of said stock-tens conductors, and means for fully energizing one of said partially energized relays over one of said stock-units conductors, said last means including a circuit extending through contacts on the partially energized relay.

9. In a stock-quotation receiver, a stock register having a normal position and a plurality of off-normal positions, means including a sending device for transmitting impulses to said stock register to return it from any off-normal position to its normal position, means in said stock register for opening its operating circuit when it reaches its normal position, and a testing device connected in circuit with said stock register in shunt of said sending device and responsive to the opening of the circuit by the stock register for stopping the transmission of impulses thereto.

10. In a stock-quotation receiver, registering, storing, and resending apparatus, holding circuits for said registering, storing, and resending apparatus, a release relay controlling all of said holding circuits, means responsive to a predetermined setting of the registering apparatus for operating said relay to open all of said holding circuits, a slow-acting relay, and means including said slow-acting relay for maintaining said release relay operated for a sufficient length of time to insure the restoration of any operated apparatus.

11. In combination, an indicating board having impulse-operated indicators thereon, a receiver arranged to receive a series of impulses indicative of a desired indicator and to receive subsequently a series of impulses indicative of a desired new setting of such indicator, selecting means in said receiver responsive to the first series of impulses for selecting the corresponding indicator, sending means in said receiver effective while the second series of impulses is being received to transmit a series of impulses to the selected indicator to restore it to normal position and effective after the second series of impulses has been received for sending an additional series of impulses to the selected indicator in accordance with the value of the second received series of impulses to set the indicator in a corresponding new position, and means for preventing said sending means from sending the series of restoring impulses to said indicator before the first impulse of the second series has been received.

12. In a receiving device, a plurality of chains of counting relays, two like pluralities of storage devices, means for transmitting digits by variable series of impulses to said relay chains simultaneously, means effective when the digits are all received for transferring them to the first plurality of storage devices, means for releasing said relay chains to enable them to receive additional digits, and means effective when the additional digits are all received for transferring them to the second plurality of storage devices.

13. In a stock quotation receiver, a plurality of polarized relays controlled over a single circuit by impulses representing digits in a quotation, a like plurality of counting relay chains, means whereby said polarized relays repeat the digit impulses to said relay chains simultaneously, a plurality of storage devices, and means responsive to the cessation of the impulses representing the largest digit for causing all the digits to be transferred to said storage devices.

14. In a stock quotation receiver, means for receiving and storing digits indicative of the stock, the stock range, and the price, said storing means including registers having holding circuits, stock registers for a plurality of stocks, each register having a plurality of rows or ranges of individual indicators, means for selecting a stock and the range thereof in accordance with the stored stock and range digits, means for sending the stored price digits to the indicators in the selected range and stock register, means for automatically opening said holding circuit after the price digits are sent in order to clear out the receiver, and means for clearing out the receiver if it fails to clear out automatically, said last means including a circuit completed upon the receiving and storing of a special range digit, together with means controlled over said circuit for opening said holding circuit at another point.

15. In a stock quotation system, a plurality of indicators, each for a different stock, a plurality of registers controlled from a distant point by impulses representing digits or characters pertaining to a stock and the price thereof, a plurality of storage devices, there being a greater number of storage devices than registers, means for restoring said registers after digits have been registered thereon to enable further digits to be registered, means for transferring all registered digits to said storage devices, means for selecting a stock indicator in accordance with a portion of the stored digits, and means for resetting the selected indicator in accordance with another portion thereof.

16. In combination, a plurality of channels over which variable series of impulses are received simultaneously, a plurality of registers operated responsive to said series of impulses, respectively, a common holding circuit for maintaining said registers operated until all impulses of said series have been received, means for maintaining said holding circuit closed so long as any series is unfinished, and means responsive to the cessation of the impulses in the last series to be completed for opening said holding circuit.

17. In a stock quotation receiver, a plurality of registers, means for setting said registers simultaneously in accordance with stock digits, means for releasing said registers and for resetting them simultaneously in accordance with price digits, price range relays for variably controlling the disposition of a received quotation according to the number of price digits contained therein, and means for placing said price range relays under the control of said registers only when the registers are reset.

18. In a stock quotation receiver, stock indicators, price registers, a plurality of impulse circuits leading to said indicators and controlled by said price registers, an impulse sender for transmitting impulses over said circuits to set said indicators, a series of counting relays controlled by said sender, and contacts on said counting relays included in said impulse circuits.

19. In a stock quotation receiver, an impulse conductor and a sender for transmitting impulses thereover, a plurality of price registers, a corresponding plurality of groups of digit conductors, each price register including means for connecting said impulse conductor to any digit conductor in its associated group, as many secondary impulse conductors as there are groups of digit conductors, counting relays having contacts through which each secondary impulse conductor is multipled to all the digit conductors of the associated group, means for causing the said sender to operate the said counting relays, and stock indicators controlled over said secondary impulse conductors.

20. In a stock quotation receiver, price registers, stock indicators responsive to restoration impulses to restore to a fixed starting position and responsive to reset impulses to advance from the fixed starting position to a desired new position, a sender, counting relays controlled by said sender, branched circuits over which said sender transmits both restoration and resetting impulses to said indicators, one branch of said circuit extending through contacts of said counting relays and through contacts of said price registers, another branch of said circuits by-passing the first branch while restoration impulses are being transmitted, and means for rendering the by-pass branch of said circuits ineffective while resetting impulses are being transmitted.

MARTIN L. NELSON.
HAROLD C. ROBINSON.
JOHN I. BELLAMY.